(12) United States Patent
Oda et al.

(10) Patent No.: US 7,177,636 B2
(45) Date of Patent: Feb. 13, 2007

(54) RADIO TERMINAL, RADIO TERMINAL CONTROLLING APPARATUS AND LOCATION REGISTRATION AUXILIARY APPARATUS

(75) Inventors: Toshikane Oda, Shibuya-ku (JP); Masanobu Fujioka, Saitama (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 573 days.

(21) Appl. No.: 10/603,965

(22) Filed: Jun. 25, 2003

(65) Prior Publication Data

US 2004/0005886 A1 Jan. 8, 2004

(30) Foreign Application Priority Data

Jun. 25, 2002 (JP) .............................. 2002-185108

(51) Int. Cl.
*H04Q 7/20* (2006.01)
(52) U.S. Cl. ...................... 455/426; 455/465; 455/433; 455/436; 455/560
(58) Field of Classification Search ................ 455/426, 455/465, 433, 436, 560
See application file for complete search history.

(56) References Cited

U.S. PATENT DOCUMENTS

| | | | |
|---|---|---|---|
| 6,067,529 A * | 5/2000 | Ray et al. ...................... 705/26 |
| 6,487,602 B1 * | 11/2002 | Thakker ...................... 709/230 |
| 6,587,688 B1 * | 7/2003 | Chambers et al. ........... 455/433 |
| 6,826,167 B2 * | 11/2004 | Osafune et al. .............. 370/338 |
| 6,931,249 B2 * | 8/2005 | Fors et al. .................... 455/436 |
| 2002/0147008 A1 * | 10/2002 | Kallio .......................... 455/426 |
| 2003/0134650 A1 * | 7/2003 | Sundar et al. ............... 455/465 |
| 2004/0072593 A1 * | 4/2004 | Robbins et al. ............. 455/560 |

FOREIGN PATENT DOCUMENTS

| WO | WO 98/48542 | 10/1998 |
|---|---|---|
| WO | WO 00/51375 | 8/2000 |
| WO | WO 00/79814 A1 | 12/2000 |
| WO | WO 00/79825 A1 | 12/2000 |

* cited by examiner

*Primary Examiner*—Matthew Anderson
*Assistant Examiner*—Minh Dao

(57) ABSTRACT

To reduce change on a cellular network side required at the time of utilizing a cellular network by way of an IP network.

A radio terminal 110 puts a location registration message for a cellular network 100 on an IP packet, and sends the message to an access point 102. This IP packet is transferred to a control proxy server 131. The control proxy server 131 stores a correspondence between identification information on a radio terminal and an IP address based on a location registration request. If necessary, the location registration request is converted into the location registration message in compliance with a standard of the cellular network 100. The location registration message is transferred to an MSC/VLR 121 via a gateway 130. As the gateway 130 looks like an ordinary base station to the MSC/VLR 121 and an ordinary location registration message is usable, any change on the cellular network side is not necessary.

22 Claims, 18 Drawing Sheets

| | 601 | 602 | 603 | 604 |
|---|---|---|---|---|
| | Entry No. | MSI SDN | IMSI (or TMIS, p-TMSI, IMEI) | IP address |
| | 1 | 09099999XXX | 441 YY 555 XXX XXXX | 192. 168. 0. 10 |
| | 2 | 09099999XXX | 441 YY 554 XXX XXXX | 192. 168. 0. 11 |
| | ⋮ | ⋮ | ⋮ | ⋮ |

| Country number (area code) | Candidate CPS |
|---|---|
| 81 | CPS_Tokyo_100, CPS_Tokyo_101, CPS_Tokyo_102, CPS_Osaka_100 |
| 81-3 | CPS_Tokyo_101, CPS_Tokyo_102 |
| 81-6 | CPS_Osaka_100 |
| 46 | CPS_Stockholm_100, CPS_Stockholm_101 |
| 1-212 | CPS_NewYork_100, CPS_NewYork_101 |
| 1-510 | CPS_SanFrancisco_100 |
| 33 | CPS_Paris_100, CPS_Paris_101 |
| 44 | CPS_London_100, CPS_London_101, CPS_London_102, |
| ------ | ------ |

FIG. 16

| Entry No. | MSISDN | IMSI | IP address | Selective location registration | Target CPS name | Target CPS IP address |
|---|---|---|---|---|---|---|
| 1 | 09099999XXX | 441 YY 555 XXX XXXX | 192.168.0.10 | 1 | CPS_Stockholm_100 | XXX.168.0.15 |
| 2 | 09099999XXX | 441 YY 554 XXX XXXX | 192.168.0.11 | 0 | - | - |
| .. | .. | .. | .. | .. | .. | .. | columns: 1601 (Selective location registration), 1602 (Target CPS name), 1603 (Target CPS IP address)

FIG. 17

| Entry No. | MSISDN | IMSI | IP address | Selective location registration | Serving CPS name | Serving CPS IP address |
|---|---|---|---|---|---|---|
| 1 | 819099999XXX | 441 YY 555 XXX XXXX | 192.168.0.10 | 1 | CPS_Tokyo_100 | YYY.168.0.15 |
| 2 | 819099999XXX | 441 YY 554 XXX XXXX | 192.168.0.11 | 0 | - | - |
| .. | .. | .. | .. | .. | .. | .. | columns: 1701 (Selective location registration), 1702 (Serving CPS name), 1703 (Serving CPS IP address)

| Entry No. | MSISDN | IMSI | IP address | PTF Activate | Target CPS IP address | Proxy terminal IMSI |
|---|---|---|---|---|---|---|
| 1 | 09099999XXX | 441 YY 555 XXX XXXX | 192.168.0.10 | 1 | YYY.168.0.15 | 240 AA11 XXX XXXX |
| 2 | 09099999XXX | 441 YY 554 XXX XXXX | 192.168.0.11 | 0 | - | - |
| .. | .. | .. | .. | .. | .. | .. |

*FIG. 21*

RADIO TERMINAL, RADIO TERMINAL CONTROLLING APPARATUS AND LOCATION REGISTRATION AUXILIARY APPARATUS

CROSS-REFERENCE TO RELATED APPLICATIONS

This application claims the benefit of the filing date as provided by 35 U.S.C. 119 of Japan patent application number 2002-185108 filed on Jun. 25, 2002, the disclosure of which is incorporated herein by reference.

BACKGROUND OF THE INVENTION

The present invention relates to a method and an apparatus for utilizing a cellular network by way of an IP network.

In recent years, an attempt to connect a telephone via an Internet has been made. This attempt is generally called Voice over Internet Protocol (VoIP). The greatest advantage of the VoIP is that the inexpensive Internet can be used as a communication line for transferring voice data. As for standards of the VoIP, there are H.323 and SIP for instance, and these are laid down by ITU (International Telecommunication Union) and IETF (Internet Engineering Task Force) respectively. As for telephone terminals used therefore, a fixed telephone and a personal computer having a microphone and a speaker are presumed.

In recent years, portable telephones are also remarkably widespread. A portable telephone is generally connected to a cellular network via a base station. On the other hand, it is expected that the future portable telephone will also have a short distance communication IF such as a Bluetooth IF mounted thereon. It will be possible, by mounting the Bluetooth IF, to connect the portable telephone to the personal computer, a peripheral, a household appliance and so on via a radio channel. In particular, it will be possible, by connecting it to an access point of the Internet via the Bluetooth IF, to access the Internet from the portable telephone and not via a public network such as a cellular network. In this case, there is an advantage that the Internet can be inexpensively accessed because the expensive cellular network is not used.

Incidentally, the International Patent Publication WO00/51375 discloses an invention wherein a so-called dual mode terminal on which a communication IF for the cellular network and the short distance communication IF are mounted is used so as to utilize the cellular network and the IP network.

According to the prior art, a subscriber's number and an IP address of the portable telephone are stored on the cellular network side so as to transfer an incoming call to the portable telephone via the IP network. For that reason, it was necessary for a home location register (HLR) and a visitor location register (VLR) on the cellular network side to manage the IP address of the portable telephone or information on an IP telephone gateway to be connected to the IP network in addition to ordinary location registration information. For this purpose, it was necessary to significantly improve the HLR and VLR on the cellular network side. In general, an improvement on the cellular network side is accompanied by change in a signaling interface and so on and so it is apt to become a large-scale improvement, which is difficult to implement.

In addition, according to the prior art, it was possible to register the portable telephone only in an area in which a user thereof actually exists.

BRIEF SUMMARY OF THE INVENTION

From a first viewpoint of the present invention, an object is to reduce the change on the cellular network side required when utilizing the cellular network by way of the IP network compared with the past.

In addition, from a second viewpoint of the present invention, another object is to register the portable telephone, when utilizing the cellular network by way of the IP network, with another area distant from the area in which the portable telephone exists. In other words, the object is to allow the user to freely select a location registration area of the portable telephone. For instance, the user can register with a Swedish cellular network while staying in Japan.

In addition, from a third viewpoint of the present invention, a further object is to transfer a call to the portable telephone registered with another area distant from the area in which the portable telephone exists and a call therefrom to the area in which the portable telephone exists by way of the IP network. For instance, it is possible for a Japanese user to register with a Swedish cellular network by way of the IP network and communicate with a Swedish user by using only the IP network and the Swedish cellular network. In this case, there is an advantage of saving expensive resources since no cellular network in Japan is used.

In addition, from a fourth viewpoint of the present invention, a still further object is to register one portable telephone with a plurality of cellular networks. For instance, it is possible to register the portable telephone of a Japanese user with the Japanese and Swedish cellular networks.

In addition, from a fifth viewpoint of the present invention, a still further object is, even in the case of the portable telephones of a different standard, to provide services as if it is the one in compliance with the standard by masquerading with or simulating a proxy terminal in compliance therewith. For instance, even in the case of the portable telephone in compliance with the WCDMA standard, it is possible, by masquerading with the proxy terminal in compliance with GSM, to enjoy European communication services while staying in Japan. Furthermore, a still further object is, by masquerading any terminal connected to the IP network with the proxy terminal, to connect the terminal to the cellular network.

In addition, from a sixth viewpoint of the present invention, a still further object is, by providing the proxy terminal for emulating a communication terminal in compliance with the standard of the public network which is a target, to masquerade any user terminal connectable to the IP network so as to provide to the user terminal the services as if to the communication terminal in compliance with the standard.

In order to attain the above objects, the present invention provides a radio terminal controlling apparatus, comprising:

first receiving means for, from a radio terminal having a first communication interface for connecting to a cellular network and a second communication interface for connecting to an Internet protocol network, receiving a location registration request sent via the above described second communication interface;

storing means for storing a correspondence between identification information on the above described radio terminal and an IP address based on the above described received location registration request;

converting means for converting the above described location registration request into a location registration message in compliance with a standard of the above described cellular network; and first sending means for sending to the cellular network the location registration message in compliance with the standard of the above described cellular network.

Thus, even in the case where the location registration request from the radio terminal is sent by way of the Internet protocol network, it is converted into a standard location registration request message used by the cellular network and then transferred to the cellular network, so that it is possible to reduce, compared with the past, the change on the cellular network side required when utilizing the cellular network by way of the IP network. In addition, it is possible, as the location registration with the cellular network can be performed by way of the IP network, to substantially expand a service area of the cellular network with a little change on the cellular network side.

In addition, from a second viewpoint of the present invention, the radio terminal controlling apparatus provided thereby is comprising:

receiving means for receiving, via the Internet protocol network, the first location registration request for registering the radio terminal of the first cellular network with the second cellular network existing in the area different from the area in which the radio terminal exists;

selecting means for selecting a location registration auxiliary apparatus for aiding the location registration with the above described second cellular network based on the above described first location registration request; and transferring means for transferring the above described first location registration request to the above described selected location registration auxiliary apparatus.

Thus, the radio terminal controlling apparatus in charge of processing on the first cellular network side and the location registration auxiliary apparatus (radio terminal controlling apparatus) in charge of processing on the second cellular network side are placed, and the location registration message is transferred between these apparatuses, so that it is possible to register with the second cellular network while the radio terminal remains in another service area.

There is provided a location registration auxiliary apparatus for communicating with the radio terminal controlling apparatus, comprising:

converting means for converting the above described first location registration request received from the above described radio: terminal controlling apparatus into the second location registration request in compliance with the standard of the above described second cellular network; and sending means for sending the above described second location registration request to a location registration register of the above described second cellular network.

There is also provided a radio terminal comprising:

a first communication interface for connecting to a cellular network;

a second communication interface for connecting to an Internet protocol network;

first message generating means for generating a first location registration message for registering with the above described cellular network;

second message generating means for generating a second location registration message based on the above described first location registration message; and sending controlling means for, controlling the above described first communication interface to have the above described first location registration message sent when registering with the above described cellular network via the above described first communication interface, and controlling the above described second communication interface to have the above described second location registration message sent when registering with the above described cellular network via the above described second communication interface and the above described Internet protocol network.

From a third viewpoint of the present invention, it is possible, as mentioned above, to register the radio terminal existing in the first cellular network with the second cellular network so that, on receiving a call set-up request from the second cellular network to the radio terminal, the above described location registration auxiliary apparatus transfers it by way of the above described Internet protocol network.

Accordingly, the radio terminal can communicate with another radio terminal belonging to the second cellular network not by way of the first cellular network.

From a fourth viewpoint of the present invention, there is provided a location registration auxiliary apparatus, further comprising:

a virtual terminal unit operating in compliance with the standard of the above described second cellular network;

activating means for activating the above described virtual terminal unit on receiving the above described first location registration request; and assigning means for assigning unique information to the above described virtual terminal unit which is activated, and wherein:

the above described virtual terminal unit generates a third location registration request for registering the above described virtual terminal unit with the above described second cellular network by using the above described unique information, and sends it to the above described location registration register.

Thus, as it is possible to perform the location registration by the virtual terminal unit and that by the radio terminal by providing the virtual terminal unit to masquerade the actual radio terminal, it is feasible to register the radio terminal substantially with a plurality of cellular networks.

From a fifth viewpoint of the present invention, there is provided a radio terminal controlling apparatus or the location registration auxiliary apparatus, further comprising a virtual terminal unit operating in compliance with the standard of the second cellular network.

The virtual terminal unit corresponding to the second cellular network distant from the area in which the radio terminal actually exists is provided, and the virtual terminal unit is registered with the second cellular network. The masquerade function of the virtual terminal unit allows the radio terminal to receive services as if having registered with the second cellular network. For instance, it is possible, even in the case of a portable telephone in compliance with the WCDMA standard, to enjoy European communication services while staying in Japan by masquerading with the virtual terminal unit in compliance with GSM.

From a sixth viewpoint of the present invention, there is provided a radio terminal emulation apparatus, comprising:

means for receiving a activation request for activating the virtual terminal unit emulating a radio terminal in compliance with the standard of the cellular network from any user terminal connected to the Internet protocol network;

means for activating the virtual terminal unit in the above described Internet protocol network based on the above described activation request;

means for storing the correspondence between the above described activated virtual terminal unit and the above described user terminal; and means for transmitting the location registration request to the above described cellular network sent by the above described activated virtual terminal unit.

That is, it is possible, by applying the principle of the masquerade function of the virtual terminal unit, to receive services as if having registered with the second cellular network from a general wire terminal (such as a personal computer for dialup connection with the Internet) or the radio terminal (such as the personal computer for connection with the Internet from a wireless LAN) connected to the IP network by way of the virtual terminal unit.

Incidentally, as for the above described radio terminal controlling apparatus or location registration auxiliary apparatus, it is not limited to a method of installing it on each of the cellular networks of different entities, but also a method of installing them on one apparatus or a few apparatuses collectively so as to be shared is possible. Accordingly, the methods of implementing the functions of the present invention as physically different apparatuses or the apparatus to be shared are included in the principle thereof.

BRIEF DESCRIPTION OF THE SEVERAL VIEWS OF THE DRAWINGS

FIG. 16 shows an example of the data structure registered with an NTDB 132a of an serving CPS 131a.

FIG. 17 is an example of the data structure registered with an NTDB 132c.

FIG. 21 is a diagram showing an example of the data structure of an NTDB 132a which has undergone a marking process.

DETAILED DESCRIPTION OF THE INVENTION

An embodiment of the present invention will be set forth below. As a matter of course, the following embodiment provides a disclosure in order to render implementation by those skilled in the art in the technical field of the present invention easier, and it is merely a portion of the embodiments included in the technical scope thereof which is established by the claims.

In addition, while certain numerical values, names, standards and so on are used in the following description, all of them are merely indicated as examples and the present invention is not limited thereby.

Figure 1:
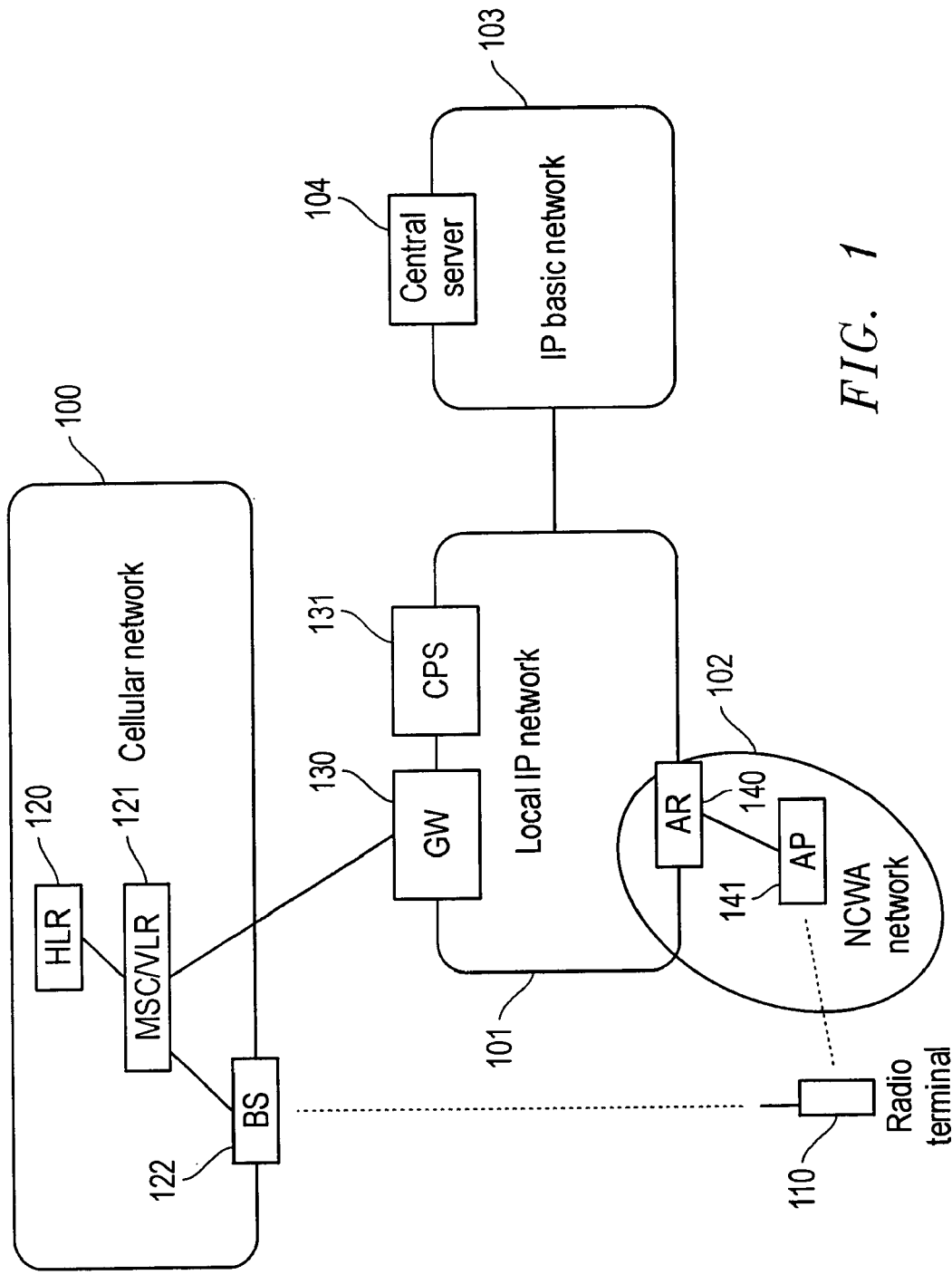
FIG. 1 is a diagram showing an overview of an illustrative communication system related to this embodiment.

FIG. 1 is a diagram showing an overview of a communication system related to this embodiment. There are the cases where "a" and "b" are added to the ends of reference numerals, which is performed for the purpose of differentiating a plurality of the same apparatuses and so on if they exist. Accordingly, the "a" or "b" at the end may be omitted in the case of describing a common configuration.

A radio terminal 110 related to this embodiment is not only connected to a cellular network 100 but also to a local IP network 101. The cellular network 100 is a radio communication network represented by GSM, PDC, CDMA and so on. The cellular network 100 includes a home location register (HLR) 120, a plurality of mobile switching centers/visitor location registers (MSC/VLR) 121 and a plurality of base stations (base station) 122. The HLR 120 registers a current position of the radio terminal on a location registration database based on a location registration message sent from the radio terminal 110.

The local IP network 101 is the IP network installed at a user's home or office. The local IP network 101 includes the following apparatuses. A gateway (GW) 130 is connected to the MSC/VLR 121, and converts a control signal, information and so on from the MSC/VLR 121 into an IP packet and inversely extracts a message included in the IP packet from the local IP network 101 so as to transfer it to the MSC/VLR 121. In addition, it may change a data format and so on as appropriate, if necessary. As for an interface between the gateway (GW) 130 and the MSC/VLR 121, the same one as the interface between the MSC and BSC (or RNC) in the GSM, the WCDMA or cdma 2000 may be adopted for instance. As a more concrete example, an A interface in the GSM, and A1, A2 and A5 interfaces in IS-2001 may be utilized. Accordingly, in spite of having no radio equipment, the gateway 130 is recognized as a base station by the MSC/VLR 121. In addition, as described below, it is possible to easily expand a service area of the cellular network in substance by allowing the location registration of the radio terminal 110 by way of the local IP network 101.

A control proxy server (CPS) 131 is a server for controlling the radio terminal 110 existing in the local IP network 101. The CPS 131 exchanges information related to the radio terminal 110 with the CPS belonging to another local IP network 101. This information may be exchanged either by way of a central server 104 or directly between the CPSs. Moreover, one CPS may be shared by a plurality of the local IP networks.

An NCWA network 102 which is a non-cellular type radio access network includes an access point 141 and an access router 140 for connecting to the radio terminal 110. As for this access point 141, the ones in compliance with wireless LAN standards such as Bluetooth, IEEE802.11, IEEE802.11b, IEEE802.11a, HiperLAN/2 and HiSWANa may be utilized.

The radio terminal 110 has the IP address statically assigned or dynamically assigned by the access router 140 or the CPS 131. Furthermore, the radio terminal 110 includes a user packet sending and receiving function and a signaling control function in order to perform communication in compliance with an IP protocol. Moreover, in the case where the radio terminal 110 has no IP address, it is identified by using an address of a layer 2 in the NCWA network 102. In this case, the radio terminal 110 does not need to have any IP-related function but it needs to have the function for implementing voice communication between itself and the access router 140 and the signaling control function related to the voice communication. In addition, it is necessary for the access router 140 to have the function as a VoIP terminal and the function of converting the IP packet including the voice data into the data format of the NCWA network 102 and transferring it to the radio terminal 110 in this case.

It is self-explanatory for those skilled in the art that while processing of a voice call will be mainly described below, real-time multimedia services and nonreal-time multimedia services are applicable instead of the voice call.

In particular, this embodiment has an advantage that the VoIP utilizing the radio terminal for the cellular network can be implemented without modifying equipment configuration on the cellular network 100 side. The major configuration implementing this advantage is, from the cellular network 100 side, the gateway 130 for operating as the base station and the radio terminal 110 for capsulating the message for the cellular network 100 and generating the IP packet. Furthermore, it is possible to provide more advanced services by providing the CPS 131.

Figure 2:
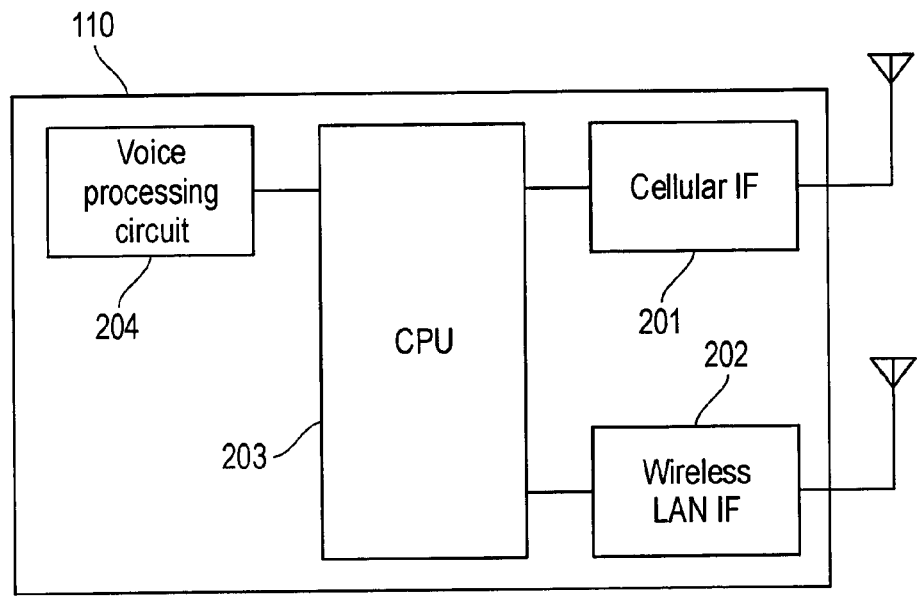
FIG. 2 is an illustrative block diagram of a radio terminal 110 related to the embodiment.

FIG. 2 is an illustrative block diagram of the radio terminal 110 related to the embodiment. It has a cellular IF 201 for radio-communicating with the base station 122 located on the cellular network 100, a wireless LAN IF 202 for radio-communicating with the AP 141 located on the NCWA network 102, a CPU 203 which is a central controlling division performing creation of various messages and so on in the radio terminal, and a voice processing circuit 204 for performing a voice encoding process. The cellular IF 201 receives a pilot signal sent by the base station 122 and measures its signal strength or signal quality. In addition, the wireless LAN IF 202 also receives the pilot signal sent by the AP 141 and measures its signal strength or signal quality. The measured signal strength or signal quality is passed to the CPU 203. The radio terminal 110 normalizes the measured signal strengths respectively. In this connection, normalization is required because the signal strength from the base station 122 and that from the AP 141 are too different to be simply compared. The normalized signal strength is compared with a predetermined threshold. As a result of the comparison, the one exceeding the threshold by a larger value is a candidate for the location registration. For instance, if the signal strength of the AP 141 is exceeding the threshold by a larger value than that of the base station 122, the CPU 203 sends the location registration message to the AP 141. Moreover, in the case where the signal quality is measured, there is normally an advantage that a comparison can be made without performing the normalization. In this case, they will be determined as the interfaces for sending the location registration message in order of lowering signal quality.

As a matter of course, it is possible to give priority to the AP 141 or inversely to the base station 122 without making such a complicated determination. The CPU 203 carries its own identification information in the location registration message. The identification information includes subscriber's numbers such as an IMSI ([International Mobile Telephone Subscriber Identity]), a TMSI ([Temporary Mobile Telephone Subscriber Identity]) and MSISDN ([Mobile System ISDN Number]) and the IP address for instance. Moreover, the location registration message is in compliance with the standard of the cellular network 100. When sending the location registration message to the AP 141, the CPU 203 capsulates the message and generates the IP packet.

Figure 3:
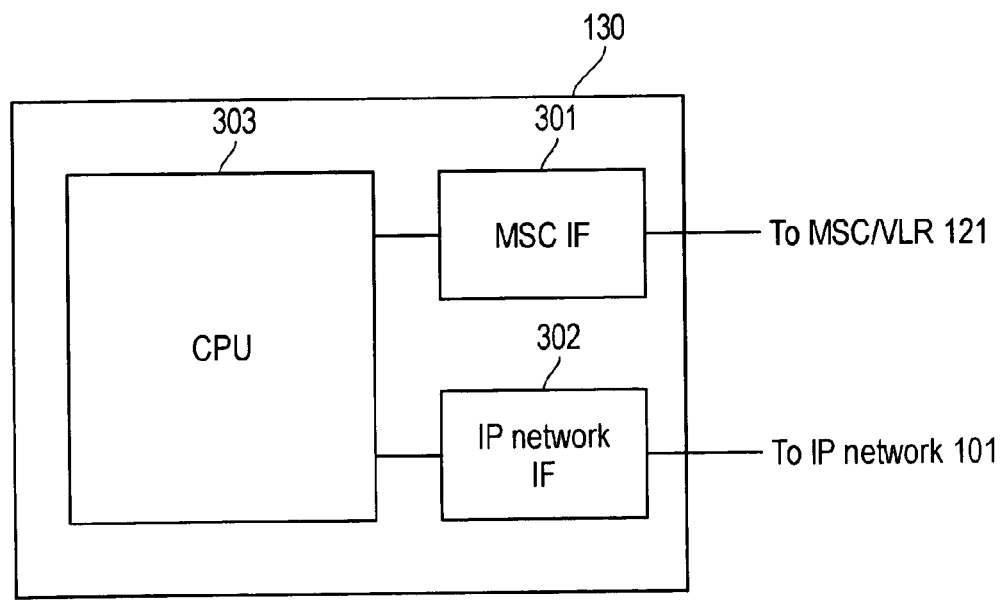
FIG. 3 is an illustrative block diagram of the gateway 130 related to the embodiment.

FIG. 3 is an illustrative block diagram of the gateway 130 related to the embodiment. The MSCIF 301 is a communication interface for connecting to the MSC/VLR 121. For instance, it may be an A interface of the GSM. An IP network IF 302 is a network interface for connecting to the local IP network 101. A CPU 303 performs media conversion such as composition and decomposition processing of the IP packet.

Figure 4:
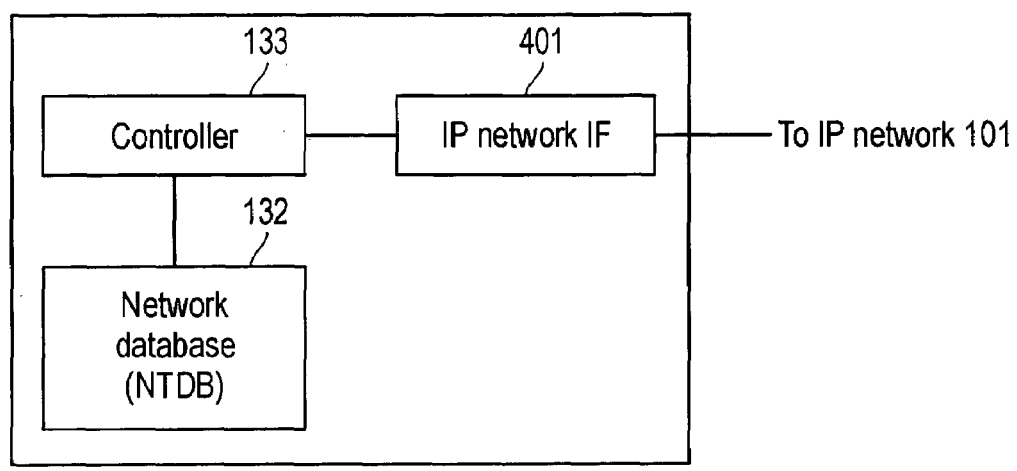
FIG. 4 is an illustrative block diagram of a CPS 131.

FIG. 4 is an illustrative block diagram of the CPS 131. An IP network IF 401 is the network interface for connecting to the local IP network 101; A controller 133 is in charge of a message conversion process and a process of registering the information related to the radio terminal with a database 132. The database 132 includes a number translation database (NTDB) for instance.

Figure 5:
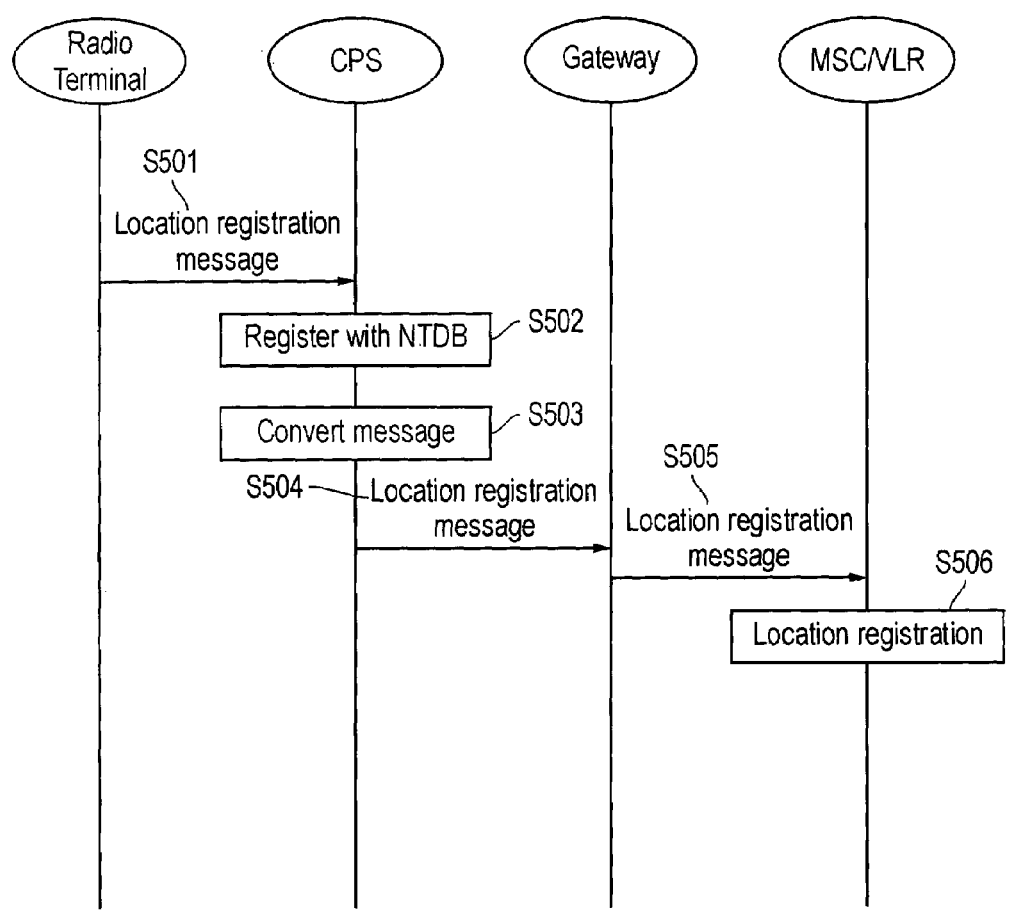
FIG. 5 is a diagram showing an illustrative signal sequence of a location registration process related to this embodiment.

FIG. 5 is a diagram showing an illustrative signal sequence of a location registration process related to this embodiment. The location registration process will be described by using this diagram. Here, it is assumed that the CPU 203 has determined to send the location registration message to the AP 141.

In step S501, the radio terminal 110 sends the IP packet of which payload is the location registration message to the AP 141. The AP 141 transfers the received IP packet to the AR 140. The AR 140 transfers the IP packet to the CPS 131. As for concrete examples of the location registration messages, there are a location updating request message of the GSM and so on, and the messages include the IMSI, TMSI, P-TMSI or IMEI ([International Mobile Equipment ID]).

In step S502, the CPS 131 decomposes the IP packet and extracts the IP address and the payload of the radio terminal 110 which is the source. On determining that the payload includes the location registration message, the CPS 131 extracts the identification information such as the IMSI and MSISDN ([Mobile System ISDN Number]) included in the location registration information. And it creates an entry for the radio terminal 110 in the database 132 and registers the IP address by associating it with the IMSI and so on.

In step S503, in the case where it is determined that the received location registration message is not a standard message of the cellular network, the CPS 131 deletes unnecessary data so that it will become the standard message. The standard message thus created is rendered as the IP packet again and is sent to the gateway 130.

Moreover, in the case where the central server 104 exists, it is also possible to transfer the location registration message to the central server 104. The central server 104 basically operates in the same way as the CPS 131. For instance, it creates the database wherein the IP address of the radio terminal is associated with the identification information such as the IMSI, and controls it. While the CPS 131 only controls the radio terminal 110 existing under it, the central server 104 is different therefrom in that it controls not only the radio terminal 110 but also all the radio terminals having sent the location registration messages by way of the local IP network.

In step S504, the gateway 130 decomposes the received IP packet and extracts the location registration message so as to transfer it to the MSC/VLR 121.

In step S505, an MSC/VLR 121a performs the location registration process in compliance with the standard of the cellular network as in the past.

The radio terminal 110 is registered with the cellular network 100 by the above processing.

Moreover, while the CPS 131 was described as the one to register the radio terminal 110 with the NTDB 132 based on the location registration message, it may also create the entry based on the IP address and the IMSI of the radio terminal 110 included in an information message in the case where the radio terminal 110 has sent the information message before sending the location registration message.

The advantage of having the CPS 131 and the central server 104 control the database of the radio terminal is that it is possible to determine whether or not a connection to a specific radio terminal by way of the IP network is possible. To be more specific, the CPS 131 or the central server 104 having received a message for inquiring about a possibility of the connection to a certain radio terminal searches the database NTDB and extracts the IMSI and so on of the radio terminal. It is determined that the connection is possible if successfully extracted, and it is determined that the connection is impossible if extraction is unsuccessful. Moreover, if the connection is possible, it means that the call can be transferred to the specific terminal only via the IP network.

In the above, in case of dynamically assigning the IP address of the radio terminal 110, the CPS 131 and the access router 140 function as DHCP servers. In particular, the case where the CPS 131 functions as the DHCP server will be described. The radio terminal 110 sends an address request message to which the IMSI or the MSISDN is added as the identification information for identifying itself. On receiving the address request message, the CPS 131 generates an arbitrary IP address and sends the generated IP address to the radio terminal 110. On the other hand, the CPS 131 may also associate the identification information of the radio terminal with the generated IP address so as to register them with the NTDB 132.

Figures 6, 7:
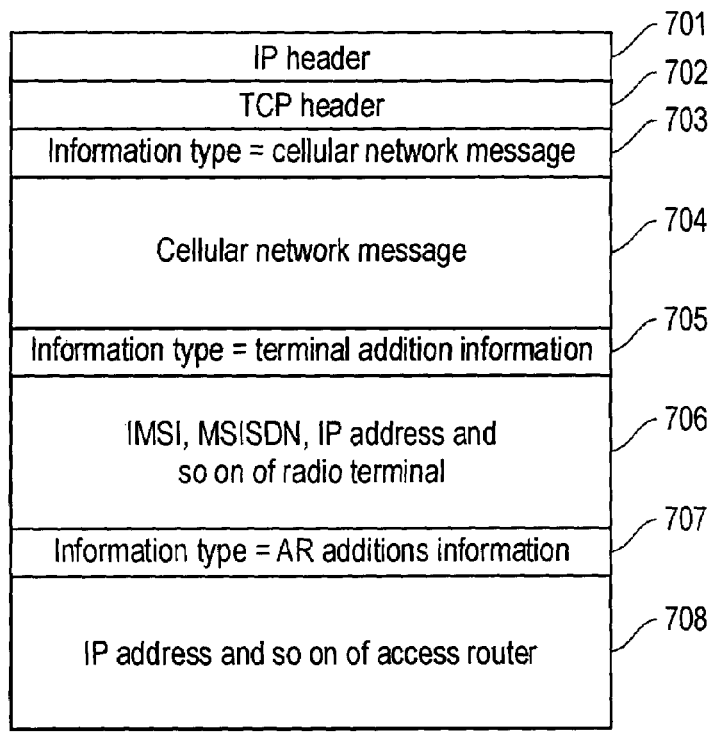
FIG. 6 is a diagram showing an example of a data structure of an NTDB 132.
FIG. 7 is a diagram showing an example of an IP packet sent from a radio terminal 110 to the CPS 131.

FIG. 6 is a diagram showing an example of a data structure of the NTDB 132. An entry number 601 is a control number given by the CPS 131. An MSISDN 602 is a telephone number in compliance with the recommendation E. 164 which is standardized by the ITU (International Telecommunication Union). An IMSI 603 is an international mobile telephone subscriber ID assigned to the radio terminal 110. An IP address 604 is the IP address assigned to the radio terminal 110. The CPS 131 performs a search by using an arbitrary number registered in the database as a search key, and extracts a corresponding entry. For instance, if it receives the IMSI of a called terminal, it outputs the IP address of a corresponding called terminal. Accordingly, the CPS 131 has a number converting function.

Moreover, in the case where a user identifier is sent by the radio terminal, it is also possible to register the user identifier on the entry instead of the IP address. In this case, the IP address corresponding to the user identifier can be obtained by using a DNS (domain name server).

FIG. 7 is a diagram showing an example of the IP packet transferred from the AR 140 to the CPS 131. In the case where the radio terminal 110 has the IP address and is able to send the IP packet directly to the local IP network, the radio terminal 110 sends the IP packet shown in FIG. 7 to the CPS 131. In the case where the radio terminal 110 is not able to directly create the IP packet and send it to the CPS 131, the AR 140 composes the IP packet shown in FIG. 7 and sends it to the CPS 131 based on a cellular network message received from the radio terminal 110. An IP header 701 is the data provided in a network layer (layer 3), and includes a destination IP address, a source IP address and so on. A TCP header 702 is the data provided in a transport layer, and includes a port number and so on. The payload portion of the IP packet includes at least an information type 703 and a message 704 corresponding to the information type. The information type 703 represents the type of the following message 704. For instance, if the message 704 is the cellular network message such as a location registration update request message of the GSM, the information type 703 includes the identification information representing the cellular network message. The message 704 has various messages sent and received between the radio terminal 110 and the MSC/VLR 121 via the base station 122 stored therein. If an information type 705 indicates terminal addition information, the next data portion 706 has the IMSI, the MSISDN, the IP address and so on of the radio terminal 110 stored therein. If an information type 707 indicates access router addition information, the next data portion 708 has the IP address and so on of the access router stored therein. The information type 707 and the data portion 708 are added by the AR 140.

Figure 8:
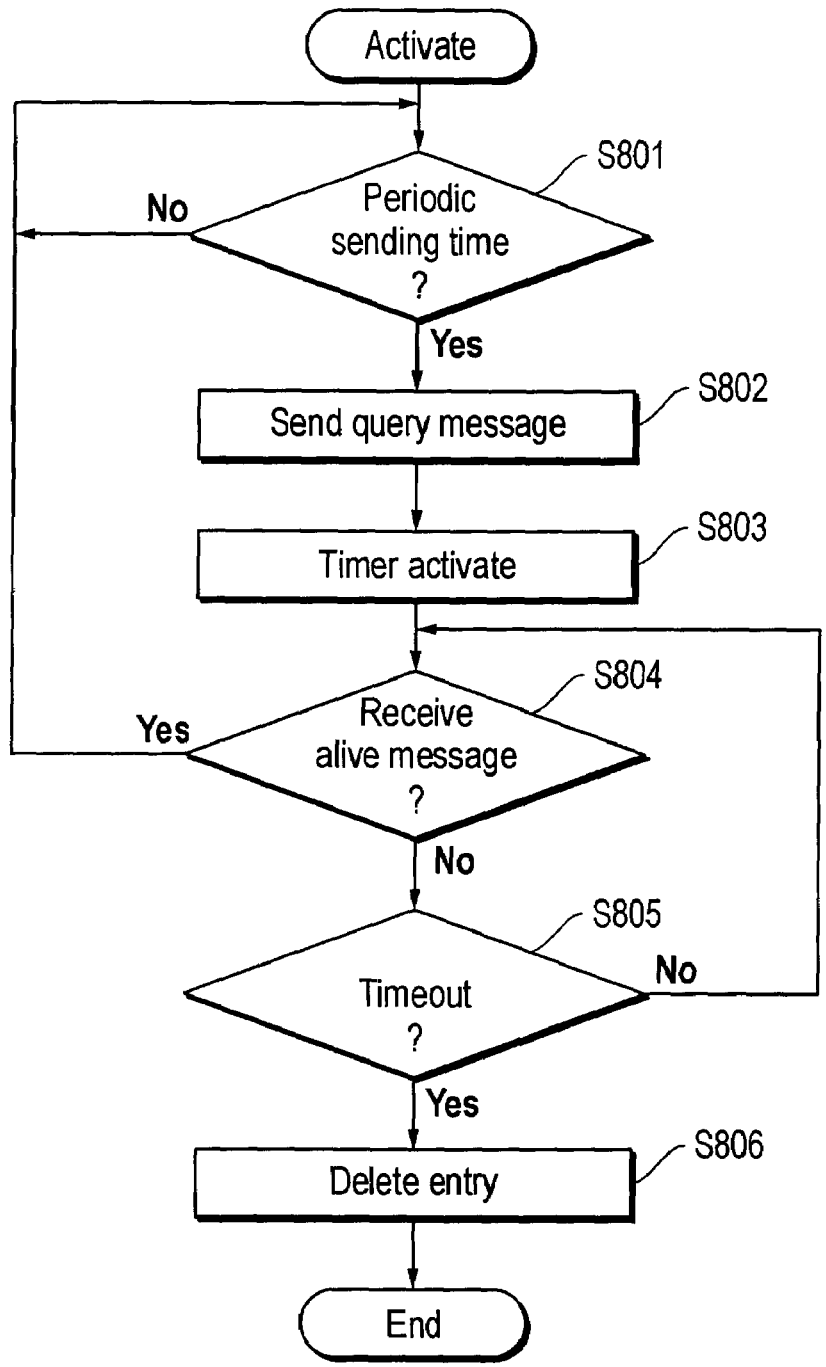
FIG. 8 is an illustrative flowchart for monitoring reachability from an IP network side to the radio terminal.

FIG. 8 is an illustrative flowchart for monitoring reachability from the IP network side to the radio terminal. In this example, the CPS 131 checks the reachability by periodically sending a query message to the radio terminal.

In step S801, the CPS 131 determines whether or not the current time is a periodic sending time.

In step S802, the CPS 131 sends the query message to the radio terminal which is a subject of a reachability check. If the radio terminal 110 is connected to the NCWA network 102, it receives the sent query message and sends an alive message to the CPS 131.

In step S803, a timer is activated. This timer is the one for monitoring whether or not a response is returned from the radio terminal 110 within a predetermined period. Moreover, step S802 and step S803 may be in inverse order.

In step S804, the CPS 131 determines whether or not the alive message is received from the radio terminal 110. If the alive message is received, it means that a connection can be made to the radio terminal 110 via the IP network. In this case, it returns to step S801 while maintaining the entry of the radio terminal. If no alive message is received, it moves on to step S805.

In step S805, the CPS 131 determines a timeout. To be more specific, if no alive message is returned past the predetermined time, the radio terminal 110 cannot be connected via the IP network. For instance, there are the cases where the radio terminal 110 moved to an outdoor location to be out of a service area of an access point 141 or the power of the radio terminal 110 is turned off.

In step S806, the CPS 131 deletes from the NTDB 132 the entry of the radio terminal to which no alive message was returned.

Thus, the NTDB 132 is periodically maintained so as to have only the radio terminals accessible from the IP network registered with the NTDB 132. Accordingly, it is possible to determine whether or not the specific radio terminal is accessible just by searching the NTDB 132.

It is prescribed by the standard that cellular network 100 should periodically send the location registration update message to the radio terminal 110. The CPS 131 may utilize this so as to render the location registration update message received via the gateway 130 as the IP packet and send it to the radio terminal 110. The radio terminal 110 receives the location registration update message via the IP network, and then sends the location registration request message via the IP network. Thus, the NTDB 132 has the entry of the radio terminal 110 maintained therein.

Instead of the check method shown in FIG. 8, it is possible to adopt the following method. For instance, it is feasible that the radio terminal 110 periodically sends the alive message, and if the alive message stops dead, the CPS 131 deletes the entry of the radio terminal 110 from the NTDB 132.

Figure 9:
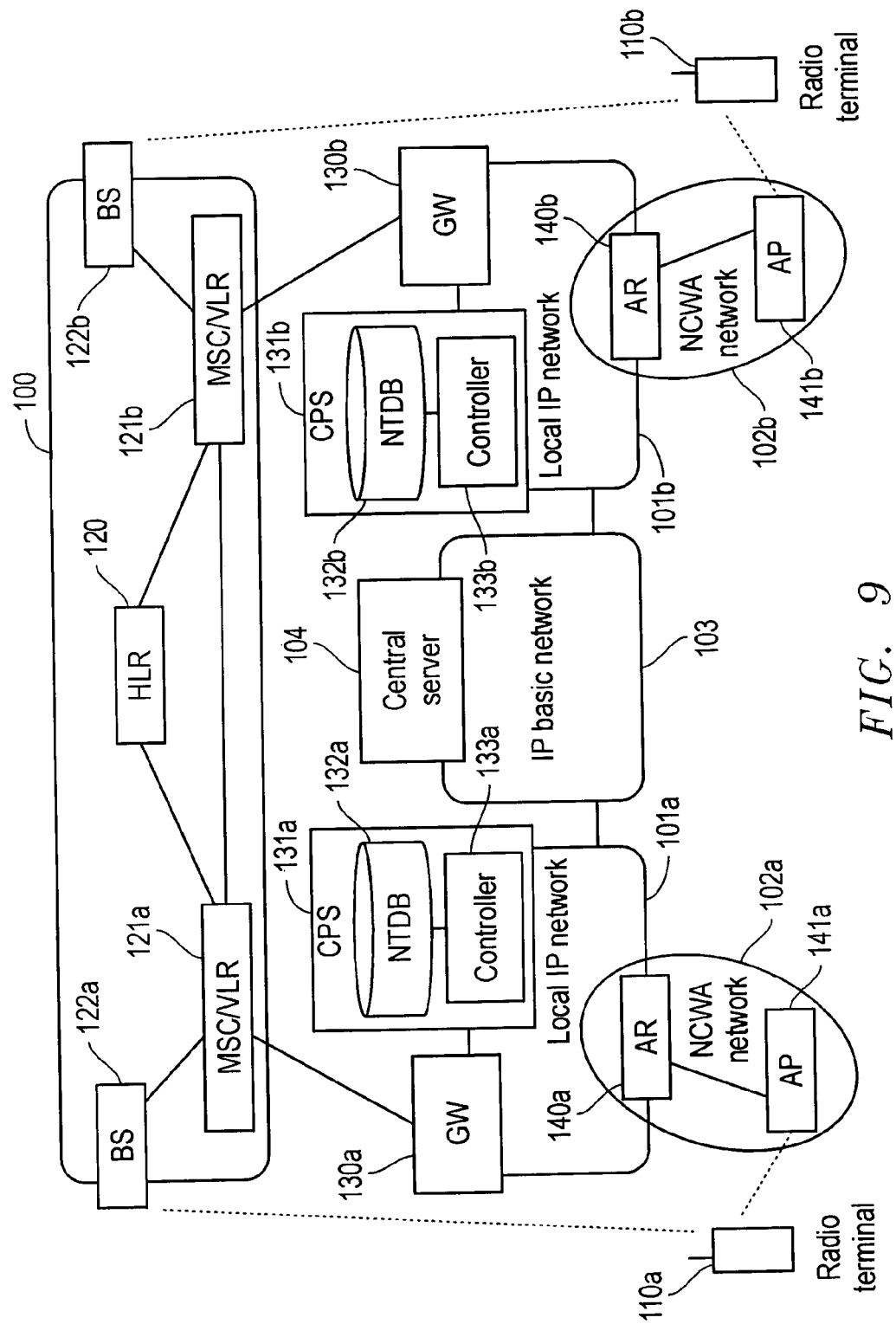
FIG. 9 is a diagram showing a communication system in the case where a plurality of radio terminals are registered via the IP network.

FIG. 9 shows a communication system in the case where a plurality of the radio terminals are registered via the IP network. A communication sequence for the above plurality of the radio terminals to communicate via the IP network will be described by using FIG. 9. For the sake of convenience of description, "a" or "b" is added to the end of a quoted symbol in order to differentiate among the plurality of the radio terminals.

In this embodiment, the description will be given on the assumption that a radio terminal 110*a* shown on the left side calls a radio terminal 110*b* on the right side. In addition, it is assumed that both the terminals are connectable from the IP network.

Figure 10:
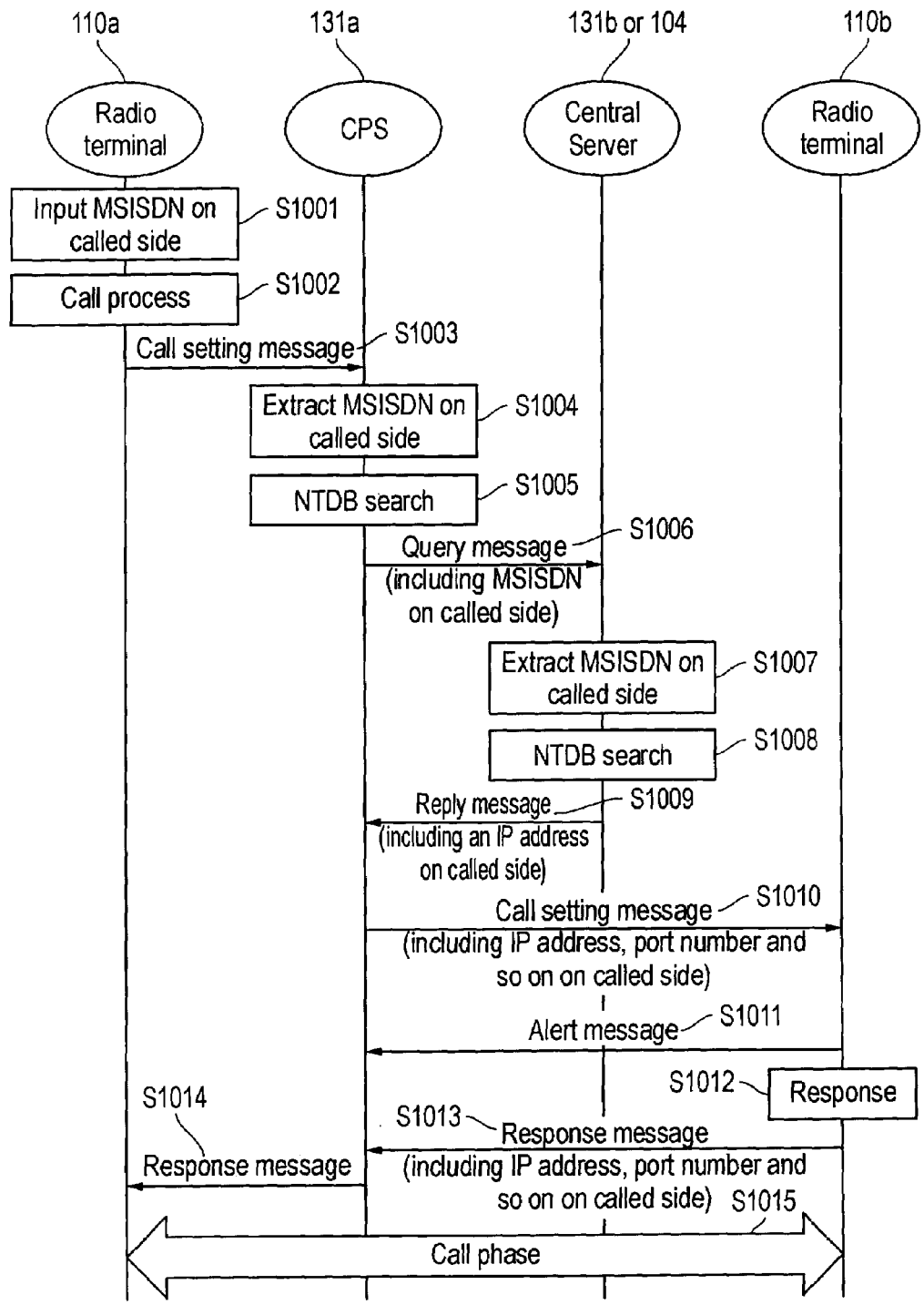
FIG. 10 is a diagram showing an example of a call sequence related to this embodiment.

FIG. 10 is a diagram showing an example of a call sequence related to this embodiment.

In step S1001, the radio terminal 110*a* accepts key input by the user and then accepts the MSISDN on the called side.

In step S1002, the radio terminal 110*a* activates a call process on detecting a push of a call activate button.

In step S1003, the radio terminal 110*a* sends a call setting message including the MSISDN on the called side. While the call setting message is currently either a base station 122*a* or an access point 141*a*, it is assumed here that the access point 141*a* is selected based on specification by the user or a current state of the location registration.

In step S1004, on receiving the IP packet including the call setting message, the CPS 131*a* extracts the MSISDN on the called side from the IP packet.

In step S1005, the CPS, 131*a* searches for the entry corresponding to the extracted MSISDN from the NTDB 132*a*. This is the process for seeking a called side terminal which may exist under a CPS 131*a*. Here, the radio terminal 110*b* on the called side is not registered with the NTDB 132*a*, and so it moved on to step S1006.

Moreover, this step may be omitted in the case of having the central server 104 search for the entry corresponding to the extracted MSISDN.

In step S1006, the CPS 131*a* sends the query message including the MSISDN on the called side to a CPS 131*b* or the central server 104. The query message is the message for requesting a search for the IP address of the terminal on the called side, and includes the MSISDN or the like on the called side as the search key.

In step S1007, the CPS 131*b* or the central server 104 extracts the MSISDN on the called side from the received query message.

In step S1008, the CPS 131*b* or the central server 104 searches the NTDB 132*b* for the entry corresponding to the extracted MSISDN.

In step S1009, the CPS 131*b* or the central server 104 sends the extracted IP address on the called side to the CPS 131*a* by carrying it in a reply message.

In step S1010, the CPS 131*a* extracts the IP address on the called side from the reply message, and sends the call setting message specifying the IP address as the destination. This call setting message has the IP address, a port number and so on of the terminal on the called side added thereto.

In step S1011, the radio terminal 110*b* on the called side receives the call setting message and activates the process of calling the user, and on the other hand, it sends an alert message to the CPS 131*a*.

In step S1012, the radio terminal 110*b* detects that a call activate button is pushed by the user.

In step S1013, the radio terminal 110*b* creates and sends a response message including the IP address and the port number of the radio terminal 110*b*. The response message may be sent to the radio terminal 110*a* via the CPS 131*a*, and on the other hand, it may also be directly sent to the radio terminal 110*a*.

In step S1014, on receiving the response message from the-radio terminal 110*b*, the CPS 131*a* sends it to the radio terminal 110*a*.

In step S1015, the communication by VoIP is performed between the radio terminal 110*a* and the radio terminal 110*b*.

In the case where both the radio terminal 110*a* and the radio terminal 110*b* are registered with the same CPS 131*a*, it is possible to omit steps S1006 to S1008, and the CPS 131*a* moves on to steps S1010 after processing step S1005.

In the example shown in FIG. 10, the radio terminal on the called side was searched for based on the location registration information registered with the NTDB. Moreover, it is possible, in this embodiment, to utilize the fact that the location registration is controlled by the cellular network so as to solve the IP address of the terminal on the called side even in the case where the radio terminal is connected to the IP network.

Figure 11:
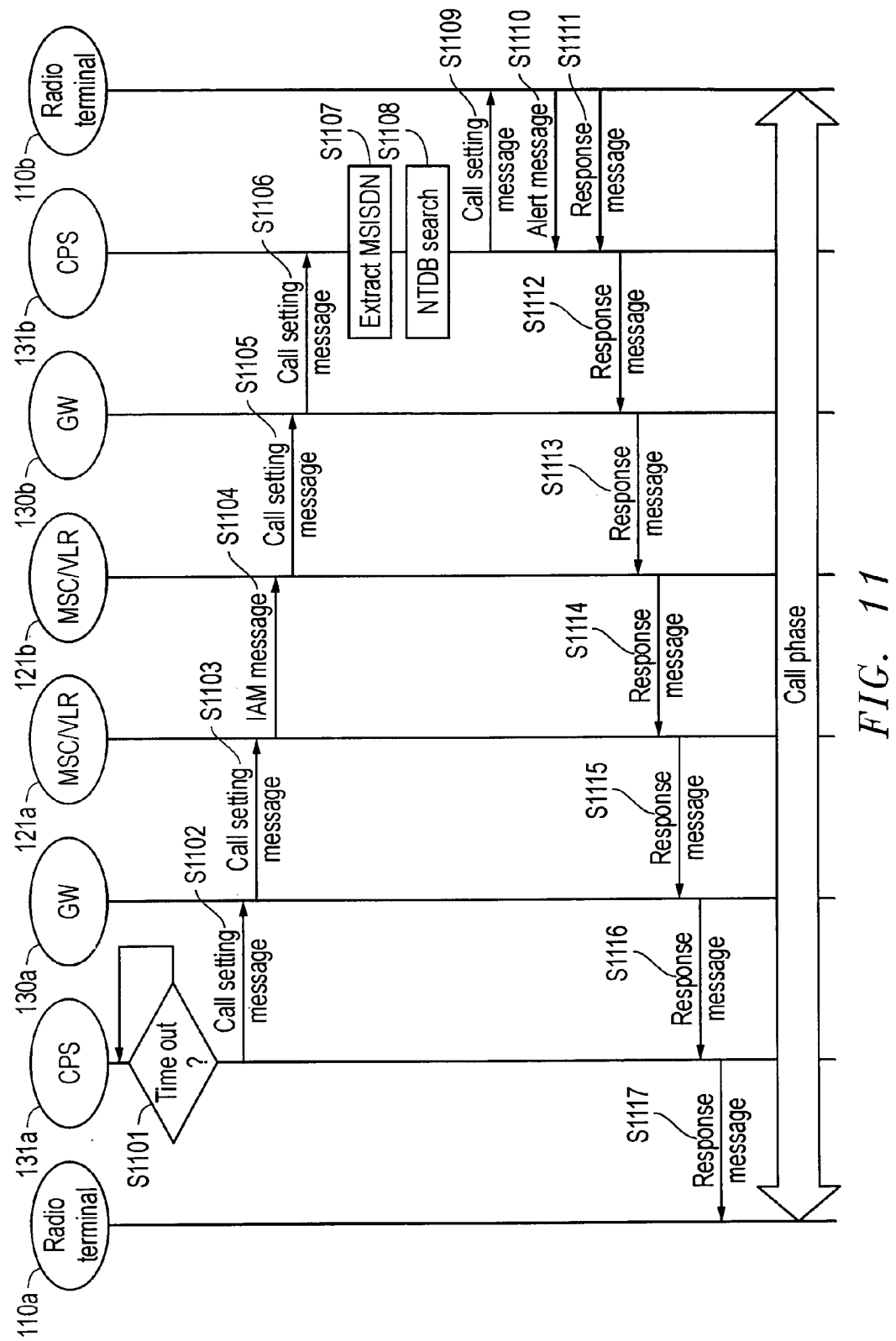
FIG. 11 is a diagram showing an illustrative signal sequence for implementing a VoIP among the plurality of the radio terminals by utilizing the location registration information held by the cellular network.

FIG. 11 is an illustrative signal sequence for implementing the VoIP among the plurality of the radio terminals by utilizing the location registration information held by the cellular network. Moreover, while this sequence may be implemented in the case where, in step S1005, the IP address on the called side could not be found or in the case where a reply message was not returned within the predetermined time after sending the query message, the latter case will be described here. To be more specific, this signal sequence provides a procedure for attempting a connection to the radio terminal on the other end via the cellular network in the case where, though a VoIP connection only using the IP network as described above based on FIG. 10 was attempted, it could not be determined that the radio terminal on the called side was connected to the IP network and the IP address and the port number of the radio terminal on the other end could not be obtained.

In step S101, the CPS 131*a* determines whether or not the reply message is returned within the predetermined time. To be more specific, it detects the timeout. On the timeout, it moves on to the next step.

In step S1102, the CPS 131*a* sends the call setting message to a gateway 130*a*.

In step S1103, on receiving the call setting message rendered as the IP packet, the gateway 130 converts it into the call setting message in compliance with the standard of the cellular network 100 and sends it to the MSC/VLR 121*a*.

In step S1104, the MSC/VLR 121a processes the call setting message by the method in compliance with the standard of the cellular network. For instance, it inquires of the HLR 120 the location registration state of the radio terminal b on the called side based on the call setting message, and obtains the information on an MSC/VLR 121b. In addition, it creates an IAM message based on the call setting message, and sends it to the MSC/VLR 121b.

In step S1105, on receiving the IAM message, the MSC/VLR 121b sends the corresponding call setting message to a gateway 130b.

In step S1106, the gateway 130b converts the received call setting message into the IP packet, and sends it to the CPS 131b.

In step S1107, the CPS 131b extracts the MSISDN on the called side from the received call setting message.

In step S1108, the CPS 131b searches for the entry corresponding to the extracted MSISDN from the NTDB 132b.

In step S1109, the CPS 131b sends the call setting message of which destination is the extracted IP address.

In step S1110, the radio terminal 110b on the called side receives the call setting message and activates the process of calling the user, and on the other hand, it sends an alert message to the CPS 131b.

In step S1111, the radio terminal 110b detects that the call activate button is pushed by the user, and the radio terminal 110b creates and sends the response message including the IP address and the port number of the radio terminal 110b.

In steps S1112 to S1116, the response message is sent to the radio terminal 110a via the CPS 131b, the gateway 130b, the MSC/VLR 121b, the MSC/VLR 121a, the gateway 130a and the CPS 131a.

The above processing allows the radio terminal 110a to move on to a communication phase by way of its own local IP network, cellular network and the other local IP network so as to communicate with the radio terminal 110b.

Figure 12:
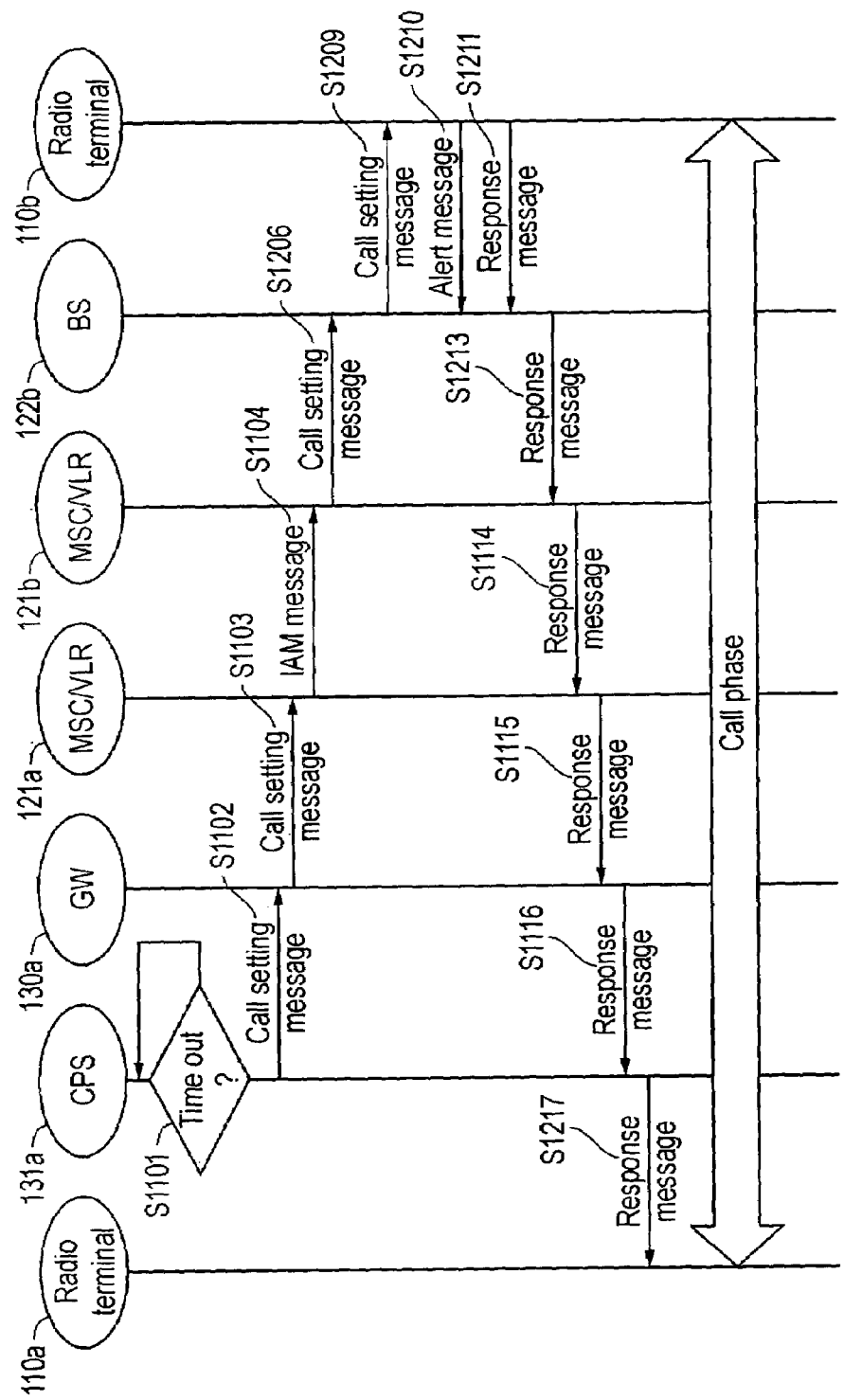
FIG. 12 is a diagram showing the sequence for connecting with a radio terminal b via a base station 122b.

FIG. 12 is a diagram showing the sequence for connecting with the radio terminal b via a base station 122b. As an example thereof, the case where the radio terminal 110b is registered not by way of a local IP network 101b but via the base station 122b is thinkable. The portions already described in FIG. 11 are given the same symbols so as to omit the description thereof.

In step S1206, the MSC/VLR 121b sends the call setting message to the base station 122b.

In step S1209, the base station 122b sends the call setting message to the radio terminal 110b.

In step S1210, the radio terminal 110b on the called side receives the call setting message and activates the process of calling the user, and on the other hand, it sends an alert message to the base station 122b.

In step S1211, the radio terminal 110b detects that the call activate button is pushed by the user, and it sends the response message to the base station 122b.

In step S1213, the base station 122b sends the response message to the MSC/VLR 121b.

In step S1217, the IP address and the port number of the gateway 130a are included in the response message and notified.

The radio terminal 110a regards the gateway 130a as the radio terminal 110b and activates the communication. On receiving the IP packet including the voice data or the one including control data from the radio terminal 130a, the gateway 130a converts it into the data format adopted by the cellular network 100 and sends it to the MSC/VLR 121a. On the other hand, on receiving the voice data and so on from the radio terminal 110b via the MSC/VLR 121a, the radio terminal 130a converts it into the data in the VoIP format and generates the IP packet so as to send it to the radio terminal 110a.

As described above, the radio terminal 110a and the radio terminal 110b move on to the communication phase.

Figure 13:
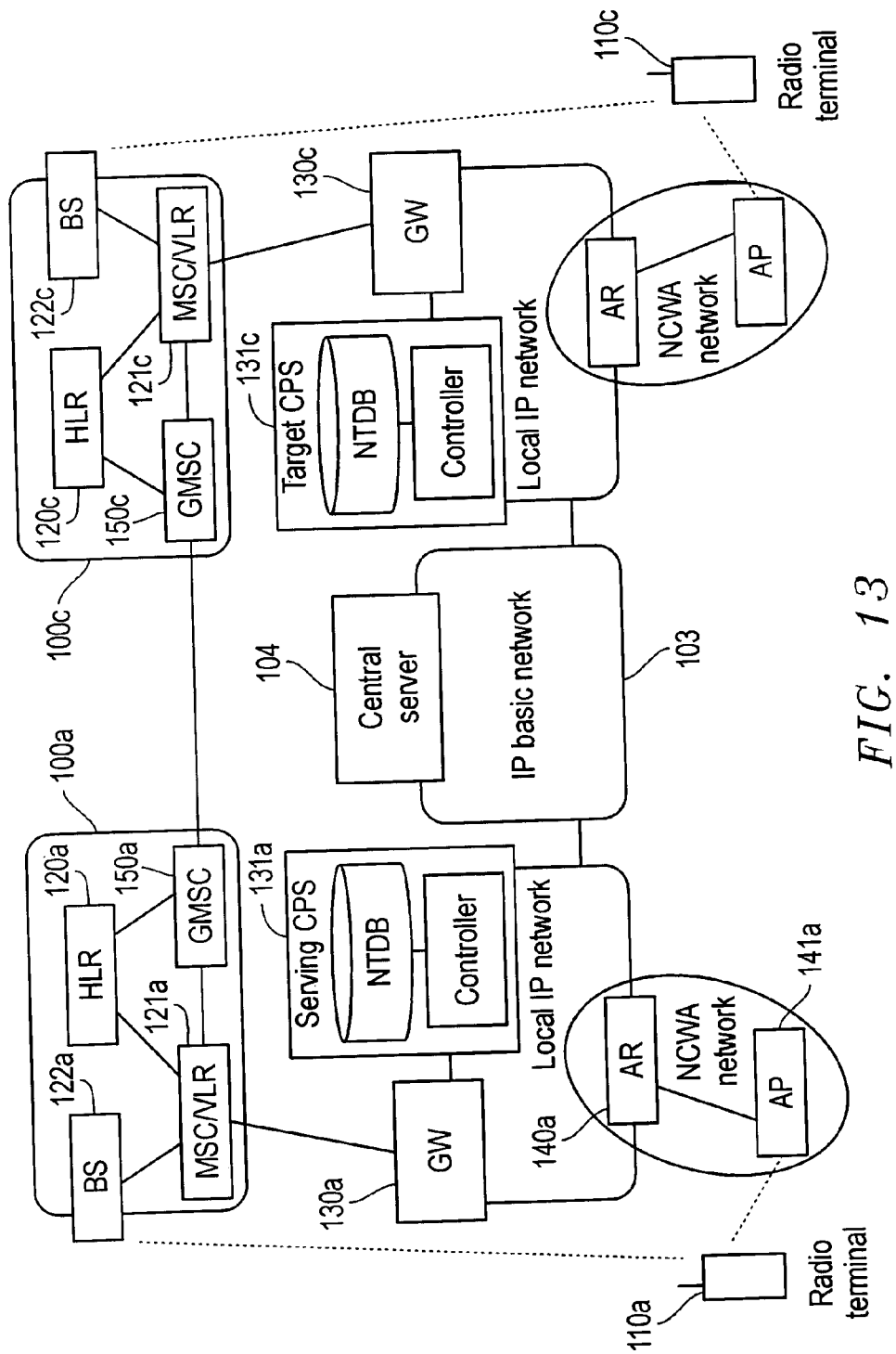
FIG. 13 is a diagram showing a configuration example of the communication system related to this embodiment.

FIG. 13 is a diagram showing a configuration example of the communication system related to this embodiment. This embodiment allows a user to dynamically select the location registration point for the cellular network. A usual location registration process can only register at a location registration point where the radio terminal actually exists. As opposed to it, this embodiment allows the user to register with another cellular network distant from the current point. For instance, it is possible to register with the cellular network in Osaka while staying in Tokyo or register with a Swedish cellular network while staying in Japan.

The advantage of registering with the location registration point in a remote location is reduction in resources required on the communication. For instance, in the case of calling a radio terminal 110c accommodated in a Swedish cellular network 100c from a radio terminal 110a accommodated in a Japanese cellular network 100a, the method in the past requires the connection to be made to the radio terminal 110c by way of a gateway mobile switching center (GMSC) 150a of the Japanese cellular network and a GMSC 150c and a base station 122c of Sweden. It is desirable not to use the resources of the cellular network since they are in general expensive.

Thus, according to this embodiment, the communication with the radio terminal 110c is accomplished not by way of the cellular network 100a but by way of the IP network and the cellular network 100c by registering the radio terminal 110a with the cellular network 100c in the remote location.

Figure 14:
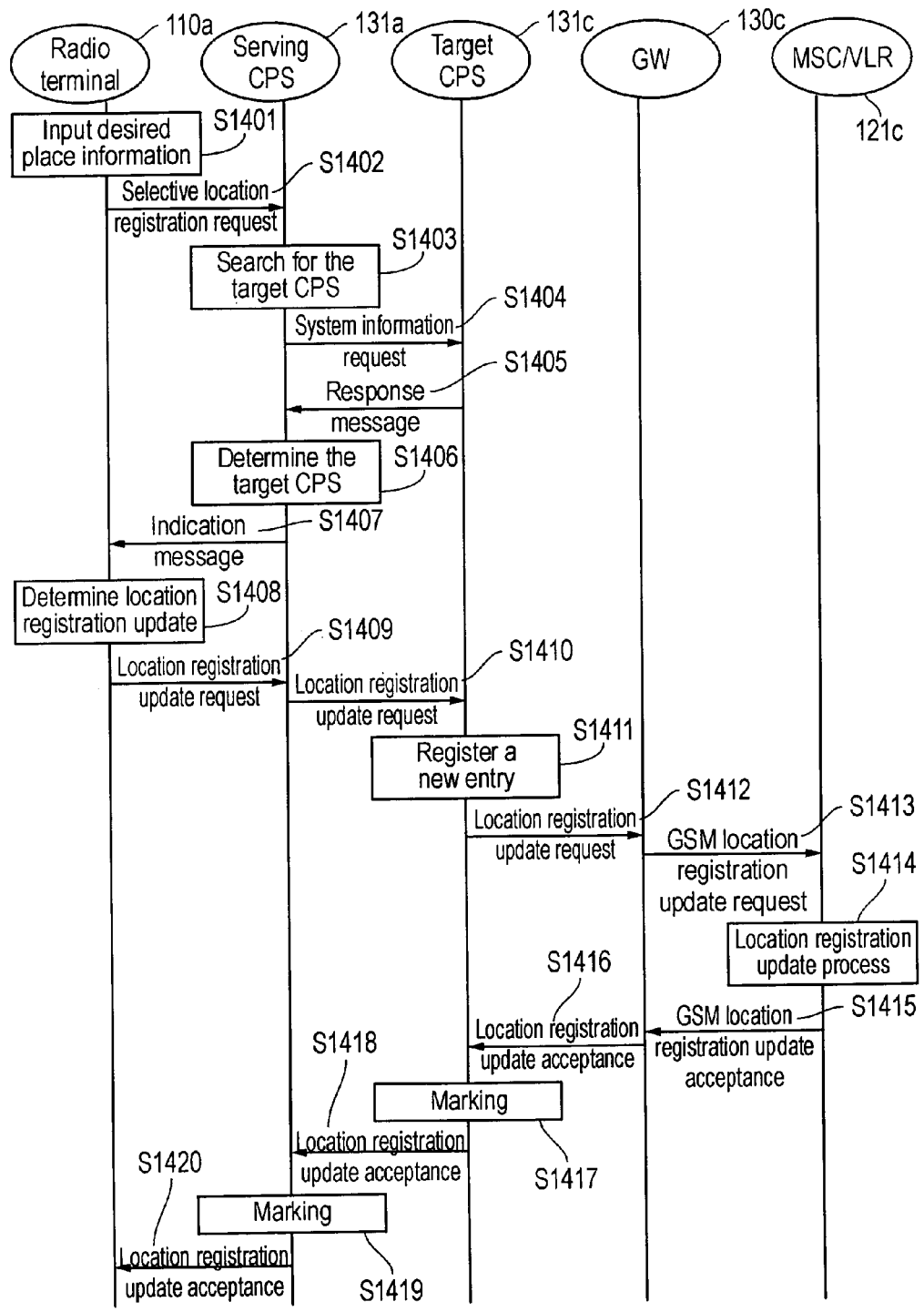
FIG. 14 is a diagram showing the signal sequence for dynamically selecting the location registration point related to this embodiment.

FIG. 14 is a diagram showing the signal sequence for dynamically selecting the location registration point related to this embodiment. Moreover, the following description will be given on the assumption that a roaming service is provided between the cellular networks 100a and 100b.

In step S1401, the radio terminal 110a inputs desired place information. The desired place information is the information on a region in which the user desires the location registration, and it may be explicit information such as a country, a city and an address or the information on a telephone number such as a country number and an area code. In addition, it is also possible to input the IMSI of the terminal on the called side. Moreover, it may be the information such as latitude and longitude.

In step S1402, a selective location registration request message for requesting a selective location registration is sent to the serving CPS 131a. The serving. CPS is the CPS of the local IP network on which the radio terminal 110a actually exists. The selective location registration request message includes not only the above-mentioned IMSI, MSISDN, and IP address, but also inputted desired place information. Moreover, it also possible to send the call setting message including the MSISDN of the radio terminal on the called side instead of this request message. In this case, it is possible to call the radio terminal 110c subsequent to the selective location registration.

In step S1403, the serving CPS 131a having received the selective location registration request message extracts the desired place information, and searches for a target CPS 110c corresponding to the desired place information from the database. The target CPS 110c is the CPS which is the target at the time of remotely registering the radio terminal 110a with the other cellular network 100c.

Figure 15:
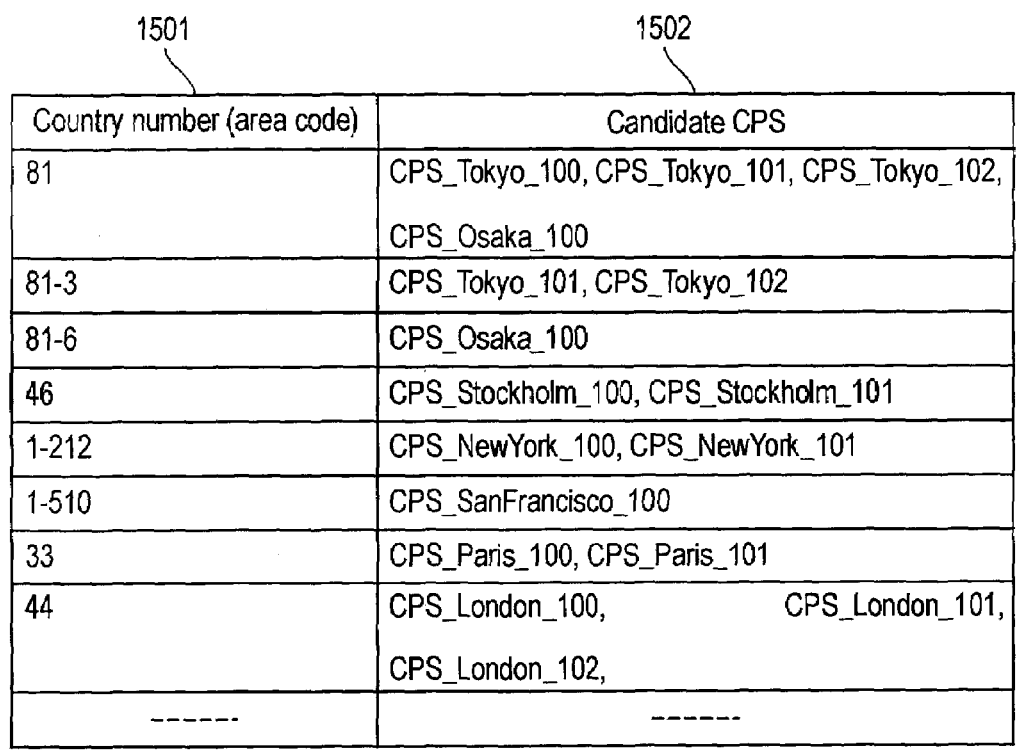
FIG. 15 is a diagram showing an example of a target determination table.

FIG. 15 is a diagram showing an example of a target determination table. An example of the selection method of the target CPS will be described by using this diagram. In this determination table, a country number (it may include an area code) 1501 is associated with a CPS 1502 which is a candidate and stored therein. The serving CPS 131a extracts the country number or the area code of a registration target from the desired place information of the registration target or extracts from the call setting message the portions of the country number and the area code of the MSISDN assigned to the called side so as to search whether or not the country number corresponding to the determination table is registered. For instance, if "81-6" is extracted from the MSISDN on the called side, CPS_Osaka_100 is obtained from the determination table.

Moreover, in the case where the central server 104 has the determination table stored therein, it is also possible for the serving CPS 131a to send the MSISDN and so on on the called side to the central server 104 and have the target CPS determined by the central server 104.

In step S1404, the serving CPS 131a sends to a candidate CPS a system information request message for requesting system information. In the case where a plurality of the candidate CPS exist, it broadcasts the message.

In step S1405, the candidate CPS (such as a CPS 131c) returns the response message including the system information. The system information includes an area identifier (LAI) such as a location registration area identifier of the GSM.

In step S1406, the serving CPS 131a determines the candidate CPS which sent the response message first to be the target CPS.

FIG. 16 shows an example of the data structure registered with the NTDB 132a of the serving CPS 131a. A selective location registration flag 1601 is the identification information representing whether or not the radio terminal of an entry No. 1 is performing the selective location registration. A target CPS name 1602 is the name of the target CPS determined in step S1406. A global IP address of the determined target CPS is stored at an IP address 1603 of the target CPS.

In step S1407, the serving CPS 131a sends a prompt message including the system information of the determined target CPS 131c to the radio terminal 110a. This prompt message is the message for prompting the radio terminal 110a to perform a new location registration to the LAI related to the target CPS anew.

In step S1408, the radio terminal 110a having received the prompt message determines to register with the target CPS 131c.

In step S1409, the radio terminal 110a sends the location registration update request message to the serving CPS 131a. This location registration update message is in compliance with the standard of the cellular network 100c. In addition, the information for transferring to the target CPS 131c is added.

In step S1410, the serving CPS 131a transfers the location registration update request message to the target CPS 131c. This message has the IP address of the radio terminal 110a and the identification information such as the IMSI added thereto. Moreover, in the case where the IP address of the radio terminal 110a is a local IP address, it is also possible to appropriately assign to the radio terminal 110a a global IP address from those in an address pool held by the serving CPS 131a.

In step S1411, the target CPS 131c having received the location registration update request message creates the entry for the radio terminal 110a in the NTDB 132c.

FIG. 17 is an example of the data structure registered with the NTDB 132c. Reference numeral 1701 denotes a flag representing that the registered radio terminal is performing the selective location registration. Reference numeral 1702 denotes the name of the serving CPS. Reference numeral 1703 denotes the global IP address of the serving CPS.

In step S1412, the target CPS 131c converts the received location registration update request message into a standard location registration update request message in compliance with the standard of the cellular network 100c as required, and sends it to a gateway 130c. Here, it is assumed that the cellular network 100c is the network in compliance with the GSM.

In step S1413, the gateway 130c sends a GSM location registration update request message included in the IP packet to an MSC/VLR 121c.

In step S1414, the MSC/VLR 121c performs a location registration update process in compliance with the GSM standard. The radio terminal 110a is thereby attached to the cellular network 100c. For instance, an authentication process of the standard, an encryption mode setting process and so on are performed between the MSC/VLR 121c and the radio terminal 110a via the target CPS 131c and so on. Moreover, if the radio terminal 110a is registered with the MSC/VLR 121a until just before it, the HLR of the radio terminal 110a sends to the MSC/VLR 121a the message to delete the entry of the radio terminal 110a.

In step S1415, the MSC/VLR 121c returns a GSM location registration update acceptance message to the gateway 130c.

In step S1416, the gateway 130c renders the GSM location registration update acceptance message as the IP packet to create a location registration update acceptance message, and returns it to the target CPS 131c.

In step S1417, on receiving the location registration update acceptance message, the target CPS 131c adds a mark to the entry of the radio terminal 110a in the NTDB 132c. This mark means that the radio terminal 110a is registered with the cellular network 100c via the gateway 130c.

In step S1418, the target CPS 131c sends the location registration update acceptance message to the serving CPS 131a.

In step S1419, the serving CPS 131a having received the location registration update acceptance message adds the mark to the entry of the radio terminal 110a in the NTDB 132c. This mark means that the radio terminal 110a is attached to the cellular network 100c via the target CPS 131c.

In step S1420, the serving CPS 131a sends the location registration acceptance message to the radio terminal 110a.

The above processing allows the radio terminal 110a to call the cellular network 100c via the IP network. As a result of it, the cellular network 110a is not used, and thus the resources and traffic thereof can be saved. It is self-explanatory for those skilled in the art that the radio terminal 110c in this case may be registered with the cellular network 100c by way of the local IP network, or may be registered by way of the base station 122c.

After the call with the radio terminal 110c is finished, the location registration is returned to the original MSC/VLR 121a. For instance, if the radio terminal 110a detects clearing, it should perform the normal location registration process by resuming the receiving of the pilot signal from the base station 122*a* or a beacon signal from the access point 141*a*. In addition, it is also possible, when the radio terminal 110*a* detects the clearing, to have the radio terminal 110*a* display a screen for selecting whether to return to the normal location registration process or to continue the selective location registration and perform one of the processes according to the selection and specification by the user.

While the example in FIG. 14 was described on the assumption that the call setting message is sent after receiving the location registration update acceptance message, it is also possible to send the call setting message from the beginning. In this case, if the serving CPS 131*a* handles the call setting message as the selective location registration request message, the radio terminal 110*a* can be registered with the cellular network 100*c* likewise. To be more specific, the radio terminal 110*a* inputs the subscriber's number on the called side in step S1401, and sends the call setting message in step S1402. Thereafter, steps S1403 to S1420 are performed, and then the call setting message held by the serving CPS 131*a* is connected to the radio terminal 110*c* by way of the target CPS 131*c*, the MSC/VLR 121*c* and the base station 122*c*.

At the time of determining the target CPS, it is also possible to utilize a position information service. The position information service is the service of notifying the position of the radio terminal on the other end from a GPS satellite based on a radio wave and so on. As it is possible to thereby obtain the position information (such as the latitude and longitude) on the terminal on the called side, the serving CPS 131*a* and the central server 104 can utilize this information to select the target CPS. The determination table in this case has the information on the latitude and longitude associated with the CPS and stored therein.

Figure 18:
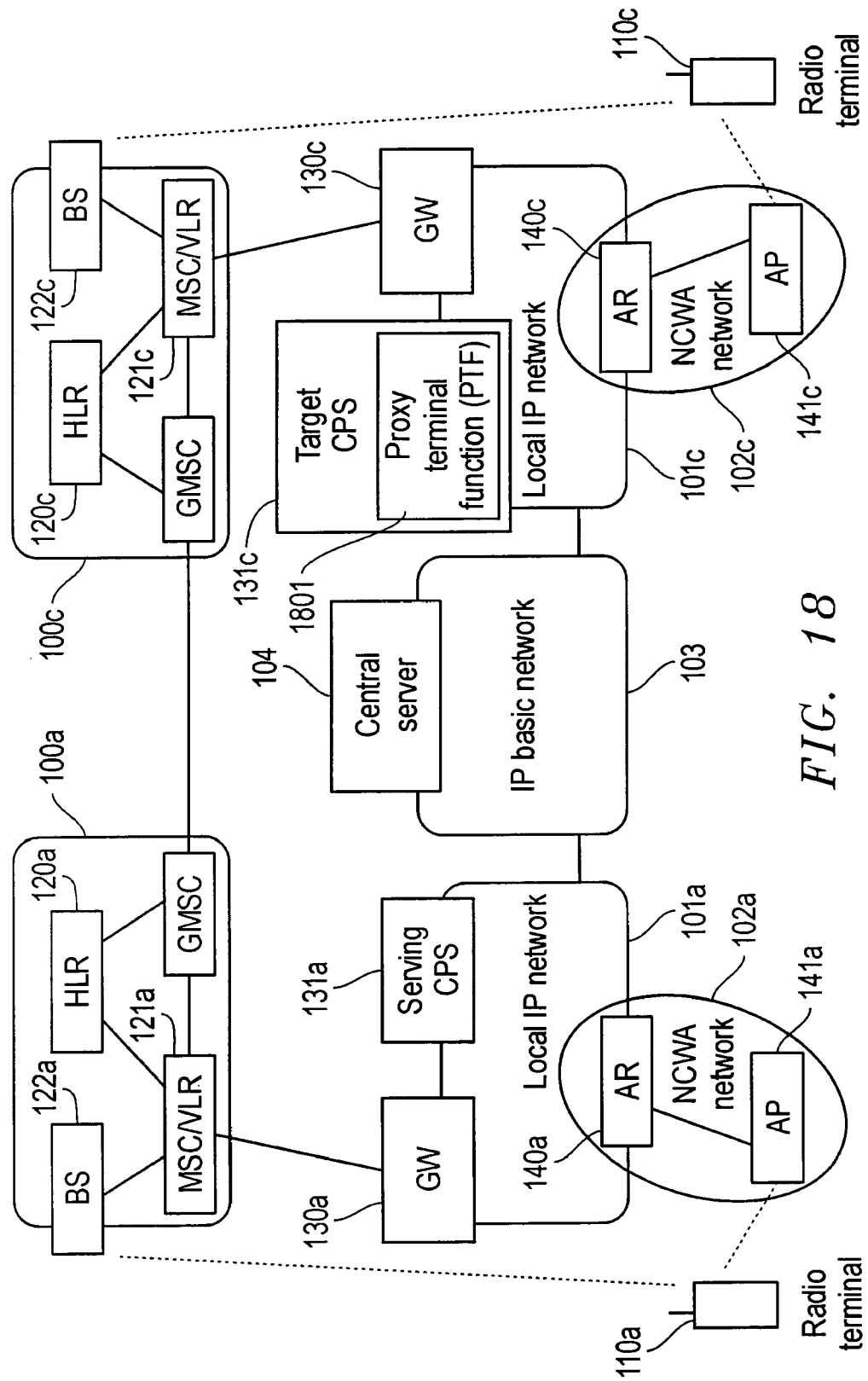
FIG. 18 is a diagram showing the communication system in the case where a proxy terminal function (PTF) is installed in the serving CPS.

FIG. 18 is a diagram showing the communication system in the case where a proxy terminal function (PTF) is installed in the CPS. A proxy terminal 1801 is a virtual terminal constructed in the target CPS, and it can register with the cellular network 100*c* as a subscriber terminal thereof, and besides, it can further communicate with the radio terminal of the cellular network 100*c* via the target CPS 131*c* and the cellular network 100*c*. The radio terminal 110*a* can register with the MSC/VLR 121*c* of the cellular network 100*c* by using the masquerade function of this proxy terminal 1801. Here, it should be noted that what is actually registered with the MSC/VLR 121*c* is the proxy terminal 1801 and is not the radio terminal 110*a*. It means that the radio terminal 110*a* can also virtually register with the MSC/VLR 121*c* while maintaining the location registration with the MSC/VLR 121*a*. To put it simply, it is possible to doubly register the radio terminal 110*a*. In addition, as it is the proxy terminal 1801 that is actually registered with the cellular network 100*c*, an environment as if allowing the roaming service is provided even though no such service is provided between the cellular networks 100*a* and 100*c*.

The proxy terminal 1801 also has a function of converting the message in compliance with the standard of the cellular network 100*a* into the one in compliance with the standard of the cellular network 100*c*. For instance, even if the radio terminal 110*a* is the terminal in compliance with the PDC, it can behave as if it is the terminal of the GSM standard since the data and services are appropriately converted by the proxy terminal 1801.

Figure 19:
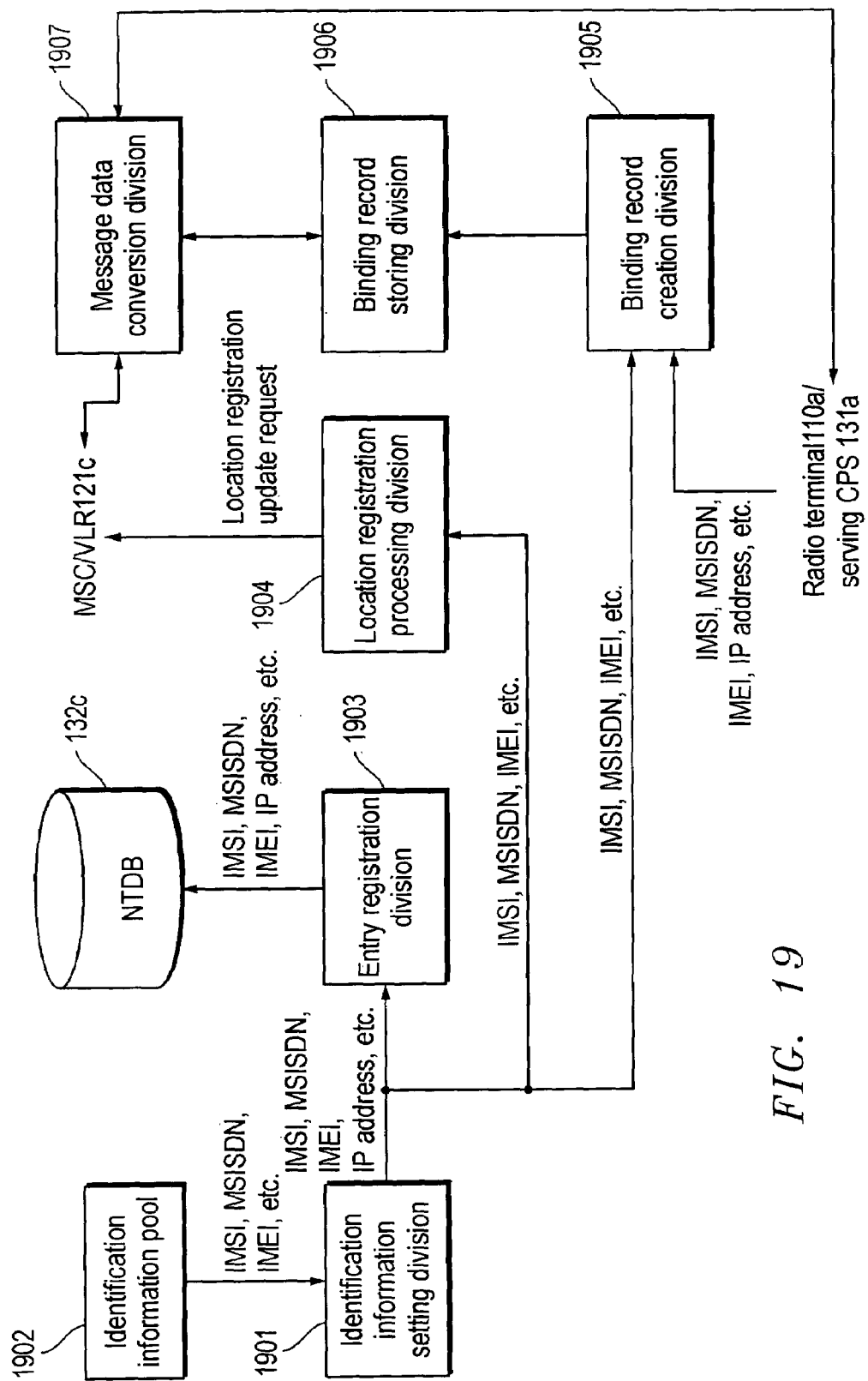
FIG. 19 is a block diagram of the proxy terminal related to this embodiment.

FIG. 19 is a block diagram of the proxy terminal related to this embodiment. If the proxy terminal 1801 is activated, an identification information setting division 1901 selects from an identification information pool 1902 stored in a storage device the IMSI, MSISDN, IMEI and so on which are free, and assigns them to the proxy terminal 1801. An entry registration division 1903 registers the proxy terminal 1801 with the NTDB 132*c*. The data to be registered is the identification information set by the identification information setting division 1901, the IP address of the target CPS 131*c* and so on. An location registration processing division 1904 registers with the MSC/VLR 121*c* in order to register the proxy terminal 1801 with the cellular network 100*c*. A binding record creation division 1905 creates a rule for converting the message and data from the radio terminal 110*a* into the message and data in compliance with the standard of the cellular network 100*c*. The created rule is stored as a binding record in a binding record storing division 1906. The message data conversion division 1907 converts the data from the MSC/VLR 121*c* into the data for the radio terminal 110*a* or inversely converts the data from the radio terminal 110*a* into the data for the MSC/VLR 121*c* based on the binding record. For instance, it converts the data in compliance with the PDC into the data in compliance with the GSM or converts the data in compliance with the WCDMA into the data in compliance with the GSM.

Figure 20:
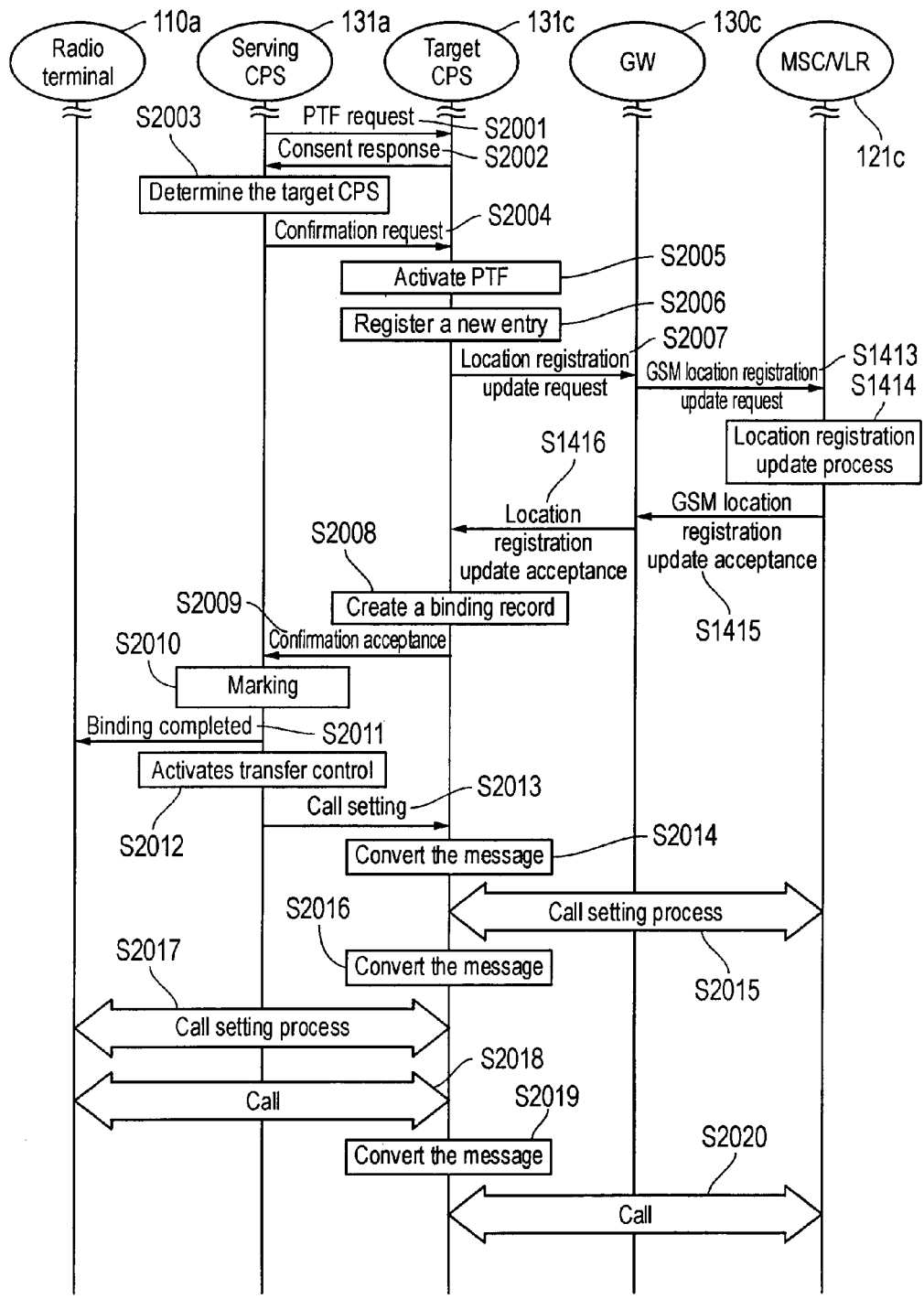
FIG. 20 is a diagram showing an example of a communication sequence for performing a call by using the proxy terminal.

FIG. 20 is a diagram showing an example of the communication sequence for performing the call by using the proxy terminal. The description will be given on the assumption that steps S1401 to S1403 have already been implemented.

In step S2001, the serving CPS 131*a* sends a proxy terminal function request message to the candidate CPS.

In step S2002, each candidate CPS determines whether or not the proxy terminal function can be activated, and sends a consent message to the serving CPS 131*a* if it can be activated.

In step S2003, the serving CPS 131*a* determines the candidate CPS which sent the consent message first as the target CPS.

In step S2004, the serving CPS 131*a* sends a confirmation request message for the proxy terminal function request to the determined target CPS 131*c*.

In step S2005, the target CPS 131*c* having received the confirmation request message activates the proxy terminal 1801. The proxy terminal may be either virtually implemented by software or implemented by a circuit having the function as the terminal.

In step S2006, the activated proxy terminal 1801 registers itself with an NTDB 131*c* of the target CPS 131*c*.

In step S2007, the proxy terminal 1801 sends the location registration update request message to the MSC/VLR 121*c* in order to register itself with the cellular network 100*c*. Thereafter, the above-mentioned steps S1413 to S1416 are performed.

In step S2008, the proxy terminal 1801 having succeeded in the location registration creates and stores the above-mentioned binding record.

In step S2009, the proxy terminal 1801 sends a confirmation acceptance message to the serving CPS 131*a* in order to notify it of a successful activation of the proxy terminal.

In step S2010, the serving CPS 131*a* having received the confirmation acceptance message marks the entry of the radio terminal 110*a* in order to represent that the radio terminal 110*a* has activated the proxy terminal. Thus, the data and message from the radio terminal 110*a* are transferred to the proxy terminal 1801, and on the other hand, the data and so on from the proxy terminal 1801 are transferred to the radio terminal 110*a*.

FIG. 21 is a diagram showing an example of the data structure of the NTDB 132*a* which has undergone a marking process. Reference numeral 2101 denotes the flag for representing that it is the radio terminal activating the PTF. Otherwise, in the case where the radio terminal has directly registered elsewhere, it can also be the flag for representing that it is doubly registered. Reference numeral 2102 denotes the IP address of the target CPS 131c wherein the proxy terminal has been activated. Reference numeral 2103 denotes the identification information (such as IMSI) set on the proxy terminal. If the serving CPS 131a receives the data and so on from the radio terminal 110a, it extracts the entry of the radio terminal 110a from the NTDB 132a. Furthermore, if it determines that the PTF activating flag 2101 is "1," it transfers the data to the proxy terminal of the target CPS.

In step S2011, the serving CPS 131a sends to the radio terminal 110a the message representing that the binding for the proxy terminal 1801 has been completed. Moreover, it is also possible, on this occasion, to notify that the location registration with the cellular network 100c has been completed. The radio terminal 110a may either continue the location registration with the MSC/VLR 121a or erase the location registration with the MSC/VLR 121a by sending a location registration erasure request message to the MSC/VLR 121a.

In step S2012, the serving CPS 131a activates a transfer control function. If the transfer control function is activated, the serving CPS 131a activates data transfer between the radio terminal 110a and the proxy terminal 1801.

In step S2013, transfer control function transfers the call setting message from the radio terminal 110a to the target CPS 131c.

In step S2014, the proxy terminal 1801 of the target CPS 131c converts the call setting message from the radio terminal 110a into the call setting message for the cellular network 100c and transfers it to the MSC/VLR 121c.

In step S2015, a call setting process is performed between the proxy terminal 1801 and the radio terminal 110c.

In step S2016, the proxy terminal 1801 converts the call setting-related message received from the MSC/VLR 121c into the message for the radio terminal 110a and sends it.

In step S2017, the call setting process is performed between the radio terminal 110a and the proxy terminal 1801. As above, the radio terminal 110a moves on to a state of a call with the radio terminal 110c due to the masquerade function of the proxy terminal 1801.

In step S2018, the transfer of the voice data is activated between the radio terminal 110a and the proxy terminal 1801.

In step S2019, the proxy terminal 1801 converts the voice data from the radio terminal 110a into that for the radio terminal 110c.

In step S2020, the transfer of the voice data is activated between the proxy terminal 1801 and the radio terminal 110c.

Moreover, after the clearing, the proxy terminal 1801 may be either maintained or terminated. It means that the radio terminal 110a may either maintain or terminate the double location registration state.

In addition, the serving CPS 131a may activate a call control function together with the transfer control function. In the case where the radio terminal 110a is masqueraded by the proxy terminal 1801 and has the call in progress with the radio terminal 110c, and if there is an incoming call from the cellular network 100a to the radio terminal 110a, the call control function returns a busy message to the cellular network 100a side.

The above embodiment was described by taking the radio terminal 110a as an example of the terminal of the user enjoying the services. However, the user terminal related to the present invention is not limited thereto. For instance, as for the user terminal, it may be a computer having an input-output function of the voice or the data, and when connecting this computer to an Internet protocol network, a radio channel such as a wireless LAN or a wire circuit such as a wire LAN or a dialup line may be utilized.

Even such an arbitrary user terminal allows the user to enjoy the communication services of other public networks by using the masquerade function of the proxy terminal 1801, if it has the software for performing the control procedure between the radio terminal 110a and the proxy terminal 1801.

For instance, on receiving from any user terminal connected to a local IP network 101a the activation request for activating the proxy terminal 1801 to emulate a portable telephone in compliance with the standard of the cellular network 100c, the target CPS 131c activates the proxy terminal 1801 in the Internet protocol network based on the activation request. Moreover, this activation request may be either an explicit activation request or a mere call request. Subsequently, the target CPS 131c assigns to the proxy terminal 1801 the identification information unique to the cellular network 100c. The unique identification information may adopt the above-mentioned IMEI, MSISDN and so on for instance. Subsequently, the correspondence between the activated proxy terminal 1801 and the user terminal is stored in a binding record storing division 1906 and so on. The proxy terminal sends the location registration request to the cellular network 100c via the gateway 130c.

The masquerade function of the proxy terminal 1801 allows any user terminal to be registered with the cellular network 100c.

After registering, it becomes possible to enjoy the communication services of the cellular network 100c. To be more specific, if the proxy terminal 1801 receives the information from the cellular network 100c, it transfers the received information from the cellular network to the user terminal based on the correspondence. For instance, if the proxy terminal 1801 receives an incoming request from the cellular network 100c, it can read the correspondence from the binding record storing division 1906 and call the above-described user terminal. Thus, the above-described user terminal can perform the communication as the portable telephone of the cellular network 100c.

On the other hand, if the proxy terminal 1801 receives the information from the user terminal, the message data conversion division 1907 converts the information into the format in compliance with the standard of the cellular network 100c. And it transfers the converted information from the user terminal to the cellular network 100c.

As described above, it is possible in principle, by using the masquerade function of the proxy terminal 1801, to enjoy the services as if connected to the cellular network from any communication terminal connected to the IP network. To be more specific, if a general IP terminal can be connected to the proxy terminal, the call from the IP terminal is processed as that from the proxy terminal, and a call-in to the proxy terminal is processed as that to the IP terminal.

While the above embodiment has been described as the one wherein one CPS and gateway is placed in one local IP network in principle, the present invention is not limited thereto as a matter of course. For instance, it is possible for a plurality of the local IP networks to share one CPS and gateway. In addition, it is also possible to implement the CPS and gateway singly in the apparatus.

From a first viewpoint of the present invention, even in the case where the location registration request from the radio terminal is sent by way of the Internet protocol network, it is converted into a standard location registration request message used by the cellular network and then transferred to the cellular network, so that it is possible to reduce, compared with the past, the change on the cellular network side required at the time of utilizing the cellular network by way of the IP network. In addition, it is possible to easily expand a service area of the cellular network with a little change on the cellular network.

From a second viewpoint of the present invention, the radio terminal controlling apparatus in charge of the processing on the first cellular network side and a location registration auxiliary apparatus (radio terminal controlling apparatus) in charge of the processing on the second cellular network side are placed, and the location registration message is transferred between these apparatuses, so that it is possible to register with the second cellular network while the radio terminal remains in the service area of the first cellular network.

From a third viewpoint of the present invention, it is possible, as mentioned above, to register the radio terminal existing in the first cellular network with the second cellular network so that, on receiving the call set-up request from the above described second cellular network to the radio terminal, the above described location registration auxiliary apparatus transfers the call set-up request by way of the above described Internet protocol network. Accordingly, the radio terminal can communicate with another radio terminal belonging to the second cellular network not by way of the first cellular network.

From a fourth viewpoint of the present invention, as it is possible to perform the location registration by the virtual terminal unit and the location registration by the radio terminal by providing the virtual terminal unit to masquerade the actual radio terminal, it is feasible to register the radio terminal substantially with a plurality of cellular networks.

From a fifth viewpoint of the present invention, the radio terminal controlling apparatus or the location registration auxiliary, apparatus is provided, which is further having a virtual terminal unit operating in compliance with the standard of the second cellular network.

The virtual terminal unit corresponding to the second cellular network distant from the area in which the radio terminal actually exists is provided, and the virtual terminal unit is registered with the second cellular network. The masquerade function of the virtual terminal unit allows the radio terminal to receive services as if having registered with the second cellular network. For instance, it is possible, even in the case of the portable telephone in compliance with the WCDMA standard, to enjoy European communication services while staying in Japan by masquerading with the virtual terminal unit in compliance with GSM.

From a sixth viewpoint of the present invention, it is possible, by providing the proxy terminal for emulating the communication terminal in compliance with the standard of the public network which is the target, to masquerade any user terminal connectable to the IP network so as to provide to the user terminal the services as if to the communication terminal in compliance with the standard.

What is claimed:

1. A radio terminal controlling apparatus, comprising:

first receiving means for, from a radio terminal having a first communication interface for connecting to a cellular network and a second communication interface for connecting to an Internet protocol network, receiving a location registration request sent via said second communication interface;

storing means for storing a correspondence between identification information on said radio terminal and an IP address based on said received location registration request;

converting means for, in the case where said location registration request is not in compliance with a standard of said cellular network, converting the location registration request into a location registration message in compliance therewith;

first sending means for sending to the cellular network the location registration message in compliance with the standard of said cellular network;

determination means for determining whether or not the identification information on the radio terminal which is a subject of a search is stored in said storing means; and search request means for, in the case where it is determined that the identification information on said radio terminal which is the subject of the search is not stored in said storing means, sending a search request including the identification information on the radio terminal which is the subject of the search to another radio terminal controlling apparatus.

2. The radio terminal controlling apparatus according to claim 1, further comprising transfer means for, on receiving a call set-up request from a first radio terminal to a second radio terminal, having said determination means perform a determination process as to the second radio terminal, and in the case where it is determined that the identification information on said second radio terminal is stored, reading an address of the second radio terminal and transferring the call set-up request to the read address as its destination.

3. The radio terminal controlling apparatus according to claim 1, wherein said storing means also stores the correspondence between an IP address of the radio terminal controlling apparatus controlling said radio terminal and the identification information on said radio terminal.

4. The radio terminal controlling apparatus according to claim 1, further comprising transfer means for, when receiving a call set-up request from a first radio terminal to a second radio terminal, reading the IP address of the radio terminal controlling apparatus controlling said second radio terminal and transferring said call set-up request to the read IP address as its destination.

5. The radio terminal controlling apparatus according to claim 1, wherein said radio terminal which is the subject of the search is the second radio terminal on receiving a call set-up request from a first radio terminal to a second radio terminal, and in the case where the identification information on the second radio terminal is not stored in said storing means, said converting means converts said call set-up request and said sending means sends said converted call set-up request to said cellular network.

6. A location registration auxiliary apparatus for communicating with a radio terminal controlling apparatus having:

receiving means for receiving, via an Internet protocol network, a first location registration request for registering a radio terminal of a first cellular network with a second cellular network existing in an area different from the area in which the radio terminal exists;

selecting means for selecting a location registration auxiliary apparatus for aiding the location registration with said second cellular network based on said first location registration request; and transferring means for transferring said first location registration request to said selected location registration auxiliary apparatus;

said location registration auxiliary apparatus comprising:

converting means for converting said first location registration request received from said radio terminal controlling apparatus into a second location registration request in compliance with the standard of said second cellular network;

sending means for sending said second location registration request to a location registration register of said second cellular networks;

activating means for activating said virtual terminal unit on receiving said predetermined message; and assigning means for assigning unique information to said virtual terminal unit which is activated;

wherein said virtual terminal unit generates a third location registration request for registering said virtual terminal unit with said second cellular network by using said unique information, and sends it to said location registration register.

7. The location registration auxiliary apparatus according to claim 6, further comprising a conversion table for converting the first message in compliance with the standard of said first cellular network into the second message in compliance with the standard of said second cellular network.

8. The location registration auxiliary apparatus according to claim 6, further comprising a virtual terminal unit operating in compliance with the standard of said second cellular network.

9. The location registration auxiliary apparatus according to claim 6, further comprising storing means for storing the correspondence between said virtual terminal unit registered instead of said radio terminal and the radio terminal.

10. The location registration auxiliary apparatus according to claim 6, wherein said radio terminal is also registered with said first cellular network.

11. A radio terminal controlling method comprising the steps of:

from a radio terminal having a first communication interface for connecting to a cellular network and a second communication interface for connecting to an Internet protocol network, receiving a location registration request sent via said second communication interface;

storing a correspondence between identification information on said radio terminal and an address based on said received location registration request;

in the case where said location registration request is not a location registration message in compliance with a standard of said cellular network, converting the location registration request into a location registration message in compliance therewith;

sending to the cellular network the location registration message in compliance with the standard of said cellular network; and sending to the radio terminal having said identification information stored a location registration prompting message for prompting location registration based on a sending cycle according to the standard of said cellular network.

12. The radio terminal controlling method according to claim 11, further comprising a step of determining whether or not the identification information on the radio terminal which is a subject of a search is stored in said storing means.

13. The radio terminal controlling method according to claim 12 further comprising a step of, in the case where it is determined that the identification information on said radio terminal which is the subject of the search is not stored, sending a search request including the identification information on the radio terminal which is the subject of the search.

14. The radio terminal controlling method according to claim 13, wherein said radio terminal which is the subject of the search is the second radio terminal on receiving the call set-up request from the first radio terminal to the second radio terminal, and said call set-up request is converted and said converted call set-up request is sent to said cellular network in the case where the identification information on the second radio terminal is not stored.

15. The radio terminal controlling method according to claim 12, further comprising the steps of:

receiving a call set-up request from a first radio terminal to a second radio terminal;

reading an address of the second radio terminal in the case where it is determined that the identification information on said second radio terminal is stored as a result of said step of determination performed as to said second radio terminal; and transferring the call set-up request to the read address as its destination.

16. The radio terminal controlling method according to claim 12 further comprising the steps of:

receiving a call set-up request from a first radio terminal to a second radio terminal;

reading the address of the radio terminal controlling apparatus controlling said second radio terminal; and transferring said call set-up request to the read address as its destination.

17. The radio terminal controlling method according to claim 11, further comprising a step of storing the correspondence between the address of the radio terminal controlling apparatus controlling said radio terminal and the identification information on said radio terminal.

18. The radio terminal controlling method according to claim 11, further comprising a step of also sending said location registration prompting message at a time other than said sending cycle according to the standard of said cellular network.

19. The radio terminal controlling method according to claim 11, wherein said location registration prompting message is a message for prompting the location registration with said cellular network by way of said Internet protocol network.

20. A radio terminal controlling apparatus, comprising:

first receiving means for, from a radio terminal having a first communication interface for connecting to a cellular network and a second communication interface for connecting to an Internet protocol network, receiving a location registration request sent via said second communication interface;

storing means for storing a correspondence between identification information on said radio terminal and an IP address based on said received location registration request;

converting means for, in the case where said location registration request is not in compliance with a standard of said cellular network, converting the location registration request into a location registration message in compliance therewith;

first sending means for sending to the cellular network the location registration message in compliance with the standard of said cellular network; and second sending means for sending to the radio terminal having its identification information stored in said storing means a location registration prompting message for prompting location registration based on a sending cycle according to the standard of said cellular network.

21. The radio terminal controlling apparatus according to claim 20, wherein said second sending means also sends said location registration prompting message at a time other than said sending cycle according to the standard of said cellular network.

22. The radio terminal controlling apparatus according to claim 20, wherein said location registration prompting message is a message for prompting the location registration with said cellular network by way of said Internet protocol network.

* * * * *

UNITED STATES PATENT AND TRADEMARK OFFICE
CERTIFICATE OF CORRECTION

PATENT NO. : 7,177,636 B2 Page 1 of 1
APPLICATION NO. : 10/603965
DATED : February 13, 2007
INVENTOR(S) : Oda et al.

It is certified that error appears in the above-identified patent and that said Letters Patent is hereby corrected as shown below:

In Column 3, Line 48, delete "radio:" and insert -- radio --, therefor.

In Column 8, Line 31, delete "101;" and insert -- 101. --, therefor.

In Column 11, Line 50, delete "CPS," and insert -- CPS --, therefor.

In Column 12, Line 25, delete "the-radio" and insert -- the radio --, therefor.

In Column 12, Line 58, delete "S101" and insert -- S1101 --, therefor.

In Column 14, Line 51, delete "serving." and insert -- serving --, therefor.

In Column 17, Line 52, delete "110c" and insert -- 100c --, therefor.

In Column 21, Line 46, delete "auxiliary," and insert -- auxiliary --, therefor.

In Column 23, Line 18, in Claim 6, delete "networks" and insert -- network --, therefor.

Signed and Sealed this

First Day of April, 2008

JON W. DUDAS
*Director of the United States Patent and Trademark Office*